United States Patent
Wang et al.

(10) Patent No.: US 8,727,601 B2
(45) Date of Patent: *May 20, 2014

(54) DISPLAY FOR ELECTRONIC DEVICE

(75) Inventors: Yi-Kai Wang, New Taipei (TW);
Tsung-Hua Yang, New Taipei (TW);
Tarng-Shiang Hu, New Taipei (TW);
Chih-Hao Chang, New Taipei (TW);
Yu-Jung Peng, New Taipei (TW)

(73) Assignee: Wistron Corporation, New Taipei (TW)

( * ) Notice: Subject to any disclaimer, the term of this patent is extended or adjusted under 35 U.S.C. 154(b) by 64 days.

This patent is subject to a terminal disclaimer.

(21) Appl. No.: 13/334,977

(22) Filed: Dec. 22, 2011

(65) Prior Publication Data
US 2012/0243207 A1 Sep. 27, 2012

(30) Foreign Application Priority Data

Mar. 21, 2011 (TW) .............................. 100109532 A

(51) Int. Cl.
*G09F 13/08* (2006.01)

(52) U.S. Cl.
USPC .... 362/632; 362/97.1; 362/97.2; 361/679.01; 361/679.27

(58) Field of Classification Search
USPC .............. 362/97.1–97.4, 224, 225, 240, 241, 362/249.01, 249.02, 249.09, 249.11, 297, 362/346, 367, 427, 561, 600, 602, 606, 616, 362/632–634, 800, 812; 361/679.01, 361/679.02, 679.21, 379.24, 679.26, 361/679.27, 679.55, 810; 349/58, 60, 61, 349/65, 73
See application file for complete search history.

(56) References Cited

U.S. PATENT DOCUMENTS

| | | | |
|---|---|---|---|
| 5,523,930 A | 6/1996 | Fritts | |
| 5,567,042 A * | 10/1996 | Farchmin et al. | 362/241 |
| 6,016,176 A | 1/2000 | Kim et al. | |
| 6,483,482 B1 | 11/2002 | Kim | |
| 7,433,179 B2 | 10/2008 | Hisano et al. | |
| 7,548,415 B2 | 6/2009 | Kim | |

(Continued)

FOREIGN PATENT DOCUMENTS

| | | |
|---|---|---|
| CN | 1961276 | 5/2007 |
| CN | 101952788 | 1/2011 |

OTHER PUBLICATIONS

Office Action for Chinese Application No. 201110067365.2 dated Sep. 30, 2013.

*Primary Examiner* — Hargobind S Sawhney
(74) *Attorney, Agent, or Firm* — Steptoe & Johnson LLP

(57) ABSTRACT

A display includes a flexible display panel having a back face, two backlight modules disposed on the back face of the display panel and each including a contact end, and an outer casing having two casing panels respectively connected to and supporting the backlight modules oppositely of the display panel. The casing panels are pivotal to move the backlight modules and the display panel between collapsed and non-collapsed positions. In the collapsed position, the display panel is folded, and the backlight modules are parallelly spaced apart. In the non-collapsed position, the display panel is laid flat, the backlight modules coplanarly cover the back face of the display panel, and the contact ends of the backlight modules abut against each other.

28 Claims, 21 Drawing Sheets

(56) References Cited

U.S. PATENT DOCUMENTS

| | | |
|---|---|---|
| 7,570,483 B2 | 8/2009 | Kim |
| 7,714,801 B2 | 5/2010 | Kimmel |
| 7,768,596 B2 * | 8/2010 | You .................................. 349/73 |
| 8,151,501 B2 | 4/2012 | Bemelmans et al. |
| 8,228,667 B2 | 7/2012 | Ma |
| 8,385,055 B2 | 2/2013 | Kao et al. |
| 8,508,920 B2 | 8/2013 | Huitema et al. |
| 2007/0044357 A1 | 3/2007 | Biondo |
| 2010/0045892 A1 * | 2/2010 | Hu .................................. 349/58 |
| 2011/0025943 A1 * | 2/2011 | Cho .................................. 349/58 |

* cited by examiner

DISPLAY FOR ELECTRONIC DEVICE

CROSS-REFERENCE TO RELATED APPLICATION

This application claims priority of Taiwanese Patent Application No. 100109532, filed on Mar. 21, 2011, the disclosure of which is incorporated herein by reference.

BACKGROUND OF THE INVENTION

1. Field of the Invention

This invention relates to a display for an electronic device, and more particularly to a display that uses a backlight module to provide light to a flexible display panel.

2. Description of the Related Art

Currently, through the design of a flexible display panel in a portable electronic device, a housing of the electronic device can simultaneously move the flexible display panel between collapsed and non-collapsed positions. However, how to conceptualize a structural design such that a backlight module can provide uniform light to the flexible display panel when the flexible display panel is in the non-collapsed position becomes the subject of improvement of the present invention.

SUMMARY OF THE INVENTION

Therefore, an object of the present invention is to provide a display that uses a backlight module to provide uniform light to a flexible display panel, so that the flexible display panel can display uniform brightness or luminosity.

Another object of the present invention is to provide a display that has a simple structure to effectively minimize the manufacturing costs thereof.

The purpose of the present invention and the solution to the conventional technical problems are achieved through employment of the below technical means. According to one aspect of disclosure of the present invention, a display comprises a flexible display panel having a back face, two first backlight modules disposed on the back face of the flexible display panel, and an outer casing. Each first backlight module includes a first contact end. The outer casing includes two casing panels respectively connected to and supporting the first backlight modules oppositely of the flexible display panel. The casing panels are pivotal to move the first backlight modules and the flexible display panel between a collapsed position and a non-collapsed position. In the collapsed position, the flexible display panel is folded, and the first backlight modules are parallelly spaced apart. In the non-collapsed position, the flexible display panel is laid flat, the first backlight modules coplanarly cover the back face of the flexible display panel, and the first contact ends of the first backlight modules abut against each other.

The purpose of the present invention and the solution to the conventional technical problems may also be achieved through employment of the below technical means.

The first contact end of each first backlight module has a right-angled or inclined end face.

Each first backlight module includes a first main plate body having the first contact end. The first contact end includes a first resilient buffer that has a light-guiding property.

The outer casing further includes a connecting member. The casing panels are connected pivotally and respectively to two opposite ends of the connecting member. The connecting member defines a receiving space between the two opposite ends of the connecting member. The display further comprises a second backlight module disposed in the receiving space and corresponding in position to the first contact ends of the first backlight modules in the non-collapsed position.

The flexible display panel includes a foldable intermediate section, and two side panel sections on two opposite sides of the foldable intermediate section and respectively covering the first backlight modules.

The side panel sections are fixed respectively to the first backlight modules.

One of the casing panels is formed with a recess, and a pair of slide grooves on two opposite sides of the recess. One of the side panel sections is fixed to one of the first backlight modules. The other one of the first backlight modules is received in the recess. The other one of the side panel sections is slidable relative to the other one of the first backlight modules and is connected slidably to the slide grooves.

The other one of the first backlight modules is connected slidably to the recess.

Each end of the connecting member is formed with a first positioning hole, and a second positioning hole proximate to the first positioning hole. Each casing panel includes a pivot unit pivoted to the connecting member. The pivot unit is formed with a mounting groove and having a retaining element disposed in the mounting groove, and a biasing spring disposed in the mounting groove to bias outwardly the retaining element. The retaining element engages the first positioning hole in the collapsed position, and engages the second positioning hole in the non-collapsed position.

According to another aspect of this invention, a display comprises a flexible display panel having a back face, two first backlight modules disposed on the back face of the flexible display panel, a second backlight module, and an outer casing. Each first backlight module includes a first contact end. The second backlight module is disposed on the back face of the flexible display panel, and includes two opposite second contact ends. The outer casing includes a connecting member connected to the second backlight module, and two casing panels disposed pivotally on two opposite ends of the connecting member. The casing panels are connected to and support the first backlight modules and the flexible display panel. The casing panels are pivotal to move the first backlight modules and the flexible display panel between a collapsed position and a non-collapsed position. In the collapsed position, the flexible display panel is folded, and the first backlight modules are parallelly spaced apart. In the non-collapsed position, the flexible display panel is laid flat, the first and second backlight modules coplanarly cover the back face of the flexible display panel, and the first contact ends of the first backlight modules abut respectively against the second contact ends of the second backlight module.

The first contact end of each first backlight module has a right-angled or inclined end face.

Each first backlight module includes a first main plate body having the first contact end. The first contact end includes a first resilient buffer. The second backlight module includes a second main plate body having the second contact ends. Each second contact end includes a second resilient buffer. Each of the first and second resilient buffers has a light-guiding property.

One of the casing panels is formed with a recess, and a pair of slide grooves on two opposite sides of the recess. The flexible display panel includes a foldable intermediate section, and two side panel sections on two opposite sides of the foldable intermediate section and respectively covering the first backlight modules. One of the side panel sections is fixed to one of the first backlight modules. The other one of the first backlight modules is received in the recess. The other one of the side panel sections is slidable relative to the other one of the first backlight modules and is connected slidably to the slide grooves.

Each end of the connecting member is formed with a first positioning hole, and a second positioning hole proximate to the first positioning hole. Each casing panel includes a pivot unit pivoted to the connecting member. The pivot unit is formed with a mounting groove and having a retaining element disposed in the mounting groove, and a biasing spring disposed in the mounting groove to bias outwardly the retaining element. The retaining element engages the first positioning hole in the collapsed position, and engages the second positioning hole in the non-collapsed position.

The display further comprises a moving mechanism to move the second backlight module to lie coplanarly with the first backlight modules.

The moving mechanism includes a push body disposed in the receiving space below the second backlight module and having two spaced-apart projecting pins. Each casing panel is formed with a curved cam slot. Each projecting pin is slidable along the curved cam slot of a respective casing panel.

The moving mechanism includes a pair of push bodies disposed in the receiving space. Each push body includes a fixing portion, and a rotatable push portion connected to the fixing portion and biased to push the second backlight module.

The moving mechanism includes a push body disposed in the receiving space below the second backlight module, a gear rack connected to and extending downwardly from the push body, a first guide rail body extending downwardly from the push body and having an elongated guide groove, a second guide rail body provided on the connecting member and extending slidably in the elongated guide groove, a drive gear provided on one of the casing panels, and a plurality of transmission gears connected rotatably to the connecting member and disposed between and meshing with the gear rack and the drive gear.

Each casing panel includes a pivot unit pivoted to the connecting member. The moving mechanism includes two pull ropes each having two opposite ends connected respectively to the pivot unit and the second backlight module, two guide studs provided respectively on the casing panels, and a tension spring disposed in the receiving space and having two opposite ends connected respectively to the second backlight module and the connecting member. Each pull rope passes over a respective guide stud in the non-collapsed position. The tension spring biases the second backlight module to move downward.

According to still another aspect of this invention, a display comprises a flexible display panel having a back face, two first backlight modules disposed on the back face of the flexible display panel, a second backlight module disposed on the back face of the flexible display panel, and an outer casing. The outer casing includes a connecting member connected to the second backlight module, and two casing panels disposed pivotally on two opposite ends of the connecting member. The casing panels are connected to and support the first backlight modules and the flexible display panel. The casing panels are pivotal to move the first backlight modules and the flexible display panel between a collapsed position and a non-collapsed position. In the collapsed position, the flexible display panel is folded, and the first backlight modules are disposed on two opposite sides of the second backlight module. In the non-collapsed position, the flexible display panel is laid flat, the second backlight module is non-coplanar with the first backlight modules, and is disposed lower than the first backlight modules.

Through the aforesaid technical means, the advantage and efficiency of the display of the present invention reside in that through the two first backlight modules or through the combination of the two first backlight modules and the second backlight module, uniform light can be provided to the flexible display panel, so that the flexible display panel can, in turn, display uniform brightness or luminosity.

Further, through the simple structure of the display of the present invention, the manufacturing costs of the display can be effectively minimized.

BRIEF DESCRIPTION OF THE DRAWINGS

Other features and advantages of the present invention will become apparent in the following detailed description of the embodiments of the invention, with reference to the accompanying drawings, in which.

DETAILED DESCRIPTION OF THE PREFERRED EMBODIMENTS

Figure 1:
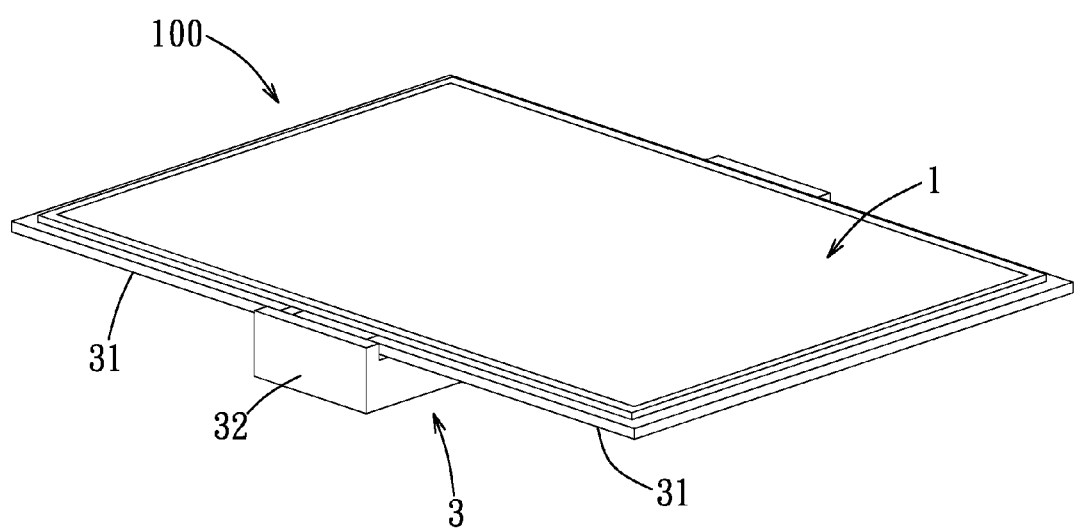
FIG. 1 is a perspective view of a display according to the first embodiment of this invention in an unfolded state.

The above-mentioned and other technical contents, features, and effects of this invention will be clearly presented from the following detailed description of nine embodiments in coordination with the reference drawings. Through description of the concrete implementation method, the technical means employed and the effectiveness to achieve the predetermined purposes of the present invention will be thoroughly and concretely understood. However, the enclosed drawings are used for reference and description only, and are not used for limiting the present invention.

Before this invention is described in detail, it should be noted that, in the following description, similar elements are designated by the same reference numerals.

Referring to FIGS. 1 to 11, a display 100 according to the first embodiment of the present invention is shown to comprise a flexible display panel 1, two first backlight modules 2, and an outer casing 3. The display 100 is applicable to a portable electronic device, such as a mobile phone, an electronic book, or a personal digital assistant (PDA).

Figure 2:
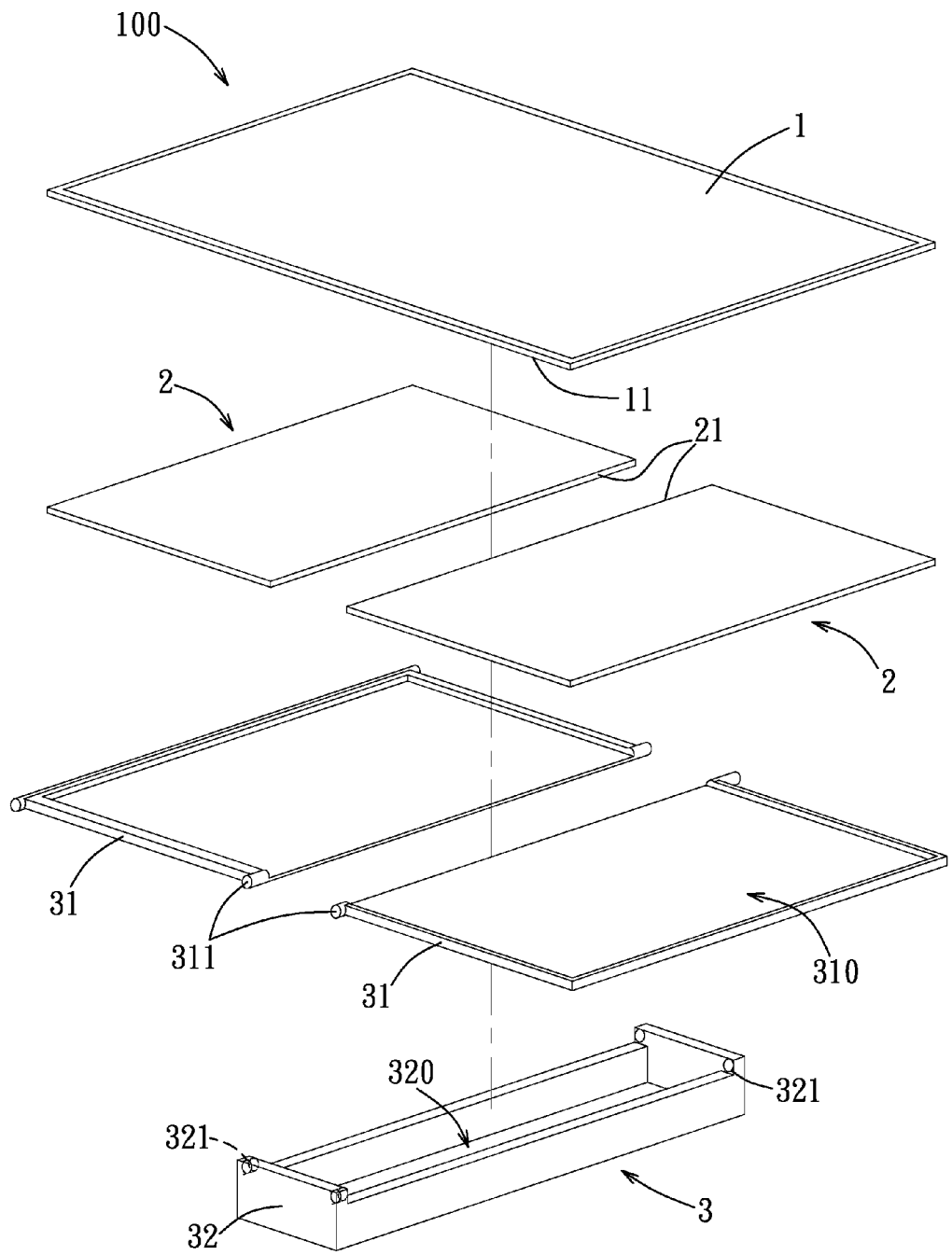
FIG. 2 is an exploded perspective view of the first embodiment.
Figure 3:
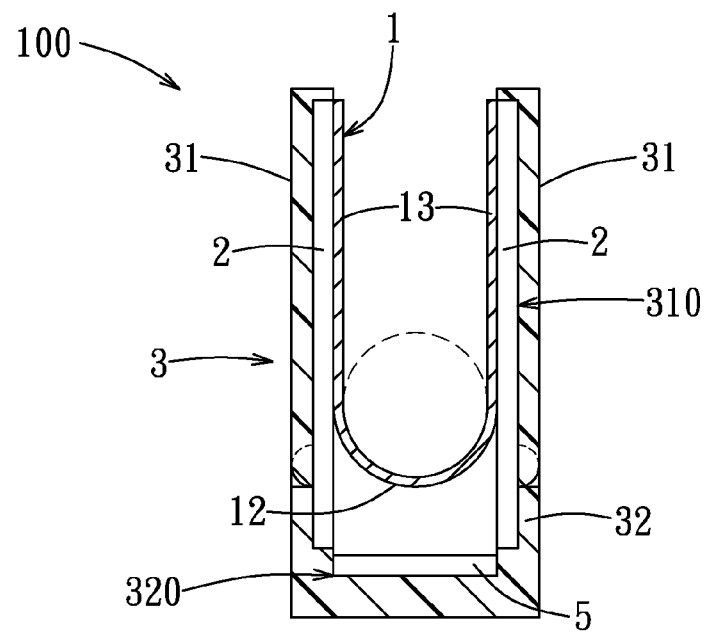
FIG. 3 is a sectional view of the first embodiment in a folded state.
Figure 4:
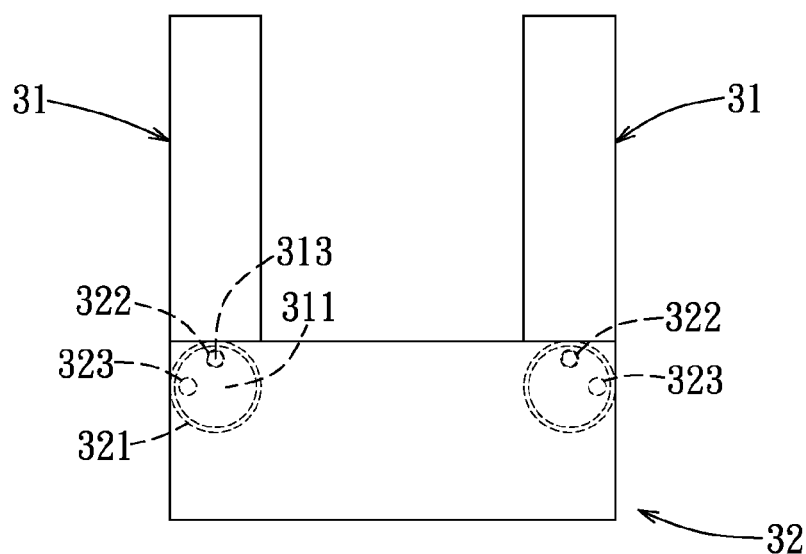
FIG. 4 is a schematic view of the first embodiment, illustrating a retaining element engaging a first positioning hole in a connecting member of an outer casing of the display when two casing panels of the outer casing are in a collapsed position.

With reference to FIGS. 2 to 4, the flexible display panel 1 has a back face 11. The two first backlight modules 2 are disposed on the back face 11 of the flexible display panel 1. Each first backlight module 2 includes a first contact end 21. The first backlight modules 2 are abuttable against each other through the first contact ends 21. The outer casing 3 includes two casing panels 31 connected to and supporting the first backlight modules 2 and the flexible display panel 1. The casing panels 31 are pivotal to move the first backlight modules 2 and the flexible display panel 1 between a collapsed position shown in FIG. 3 to a non-collapsed position shown in FIG. 6. In the collapsed position, the flexible display panel 1 is folded, and the two first backlight modules 2 are parallelly spaced apart in a left-right direction. In the non-collapsed position, the first backlight modules 4 coplanarly cover the back face 11 of the flexible display panel 1, and the first contact ends 21 of the first backlight modules 2 abut against each other. Through this configuration, the first backlight modules 2 can provide uniform light to the flexible display panel 1 so that the flexible display panel 1 can, in turn, display uniform brightness or luminosity.

Below is a detailed description of the structure and use of the display 100.

With reference to FIGS. 2 and 3, the outer casing 3 includes a connecting member 32, and two casing panels 31 connected pivotally and respectively to left and right ends of the connecting member 32. Each of the left and right ends of the connecting member 32 is formed with two pivot holes 321 spaced apart in a front-rear direction. Each of the casing panels 31 includes a pivot unit 311 pivoted to the pivot holes 321 in a corresponding one of the left and right ends of the connecting member 32, so that each casing panel 31 can rotate relative to the connecting member 32. Each casing panel 31 is formed with a recess 310. A light-emitting element (not shown) of each first backlight module 2 may be a cold cathode tube, a light-emitting diode, or an organic light-emitting diode. Each first backlight module 2 is fixed to the respective casing panel 31 within the recess 310, and provides light required by the flexible display panel 1. It should be noted that each first backlight module 2 may be fixed to the respective casing panel 31 by using an adhesive or a snap- or screw-fastening method.

The flexible display panel 1 includes a foldable intermediate section 12, and two side panel sections 13 connected respectively to left and right sides of the foldable intermediate section 12 and respectively covering the first backlight modules 2. In this embodiment, the side panel sections 13 are fixed to the respective first backlight modules 2. It should be noted that each side panel section 13 may be fixed to the respective first backlight module 2 by using an adhesive or a snap- or screw-fastening method.

Through the spaced apart left and right configuration of the first backlight modules 2, and through the fixing of the side panel sections 13 to the respective first backlight modules 2, when the casing panels 31 move the first backlight modules 2 and the flexible display panel 1 to rotate, the first backlight modules 2 will not be folded, only the foldable intermediate section 12 of the flexible display panel 1 is folded. As such, the user can easily and quickly rotate the display 1 to fold and unfold states.

Figure 5:
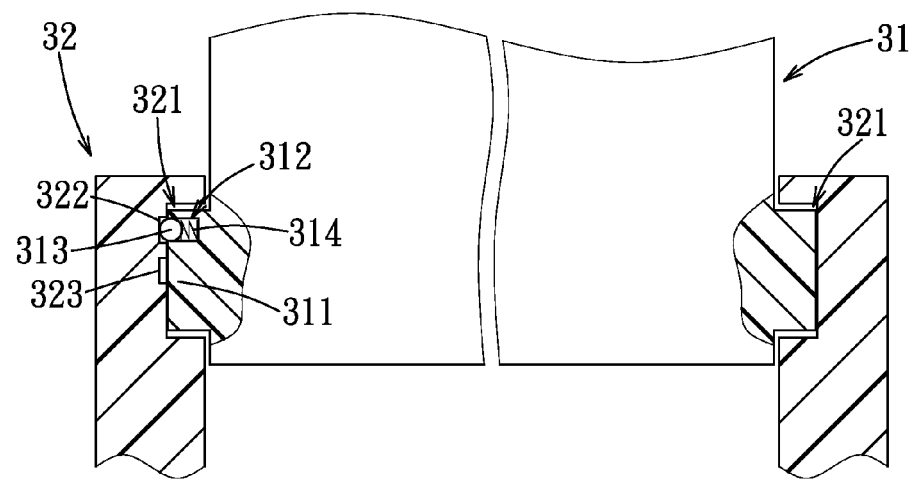
FIG. 5 is a fragmentary sectional view of the first embodiment, illustrating how the retaining element engages the first positioning hole.

With reference to FIGS. 3 to 5, when the casing panels 31 are in the collapsed position, the foldable intermediate section 12 of the flexible display panel 1 is folded to extend upward the side panel sections 13, the first backlight modules 2 are parallelly spaced apart, and the side panel sections 13 are also parallelly spaced apart. At this time, the display 100 can be easily stored by the user. Further, because the casing panels 31 are disposed externally of the flexible display panel 1 and the first backlight modules 2, the effect of protecting the flexible display panel 1 and the first backlight modules 2 can be achieved. Moreover, each of the left and right ends of the connecting member 32 is further formed with a first positioning hole 322, and a second positioning hole 323 proximate to the first positioning hole 322. Each of the first and second positioning holes 322, 323 communicates with one of the pivot holes 321. The pivot unit 311 of each casing panel 31 has one end face that is formed with a mounting groove 312 and that has a ball-shaped retaining element 313 disposed in the mounting groove 312, and a biasing spring 314 disposed in the mounting groove 312 to bias the retaining element 313 outwardly. When the casing panels 31 are in the collapsed position, the mounting groove 312 is aligned with the first positioning hole 322, and the biasing spring 314 biases the ball-shaped retaining element 313 to move out of the mounting groove 312 and engage the first positioning hole 322. Through this configuration, the casing panels 31, the first backlight modules 2, and the flexible display panel 1 are retained in the collapsed position.

Figure 6:
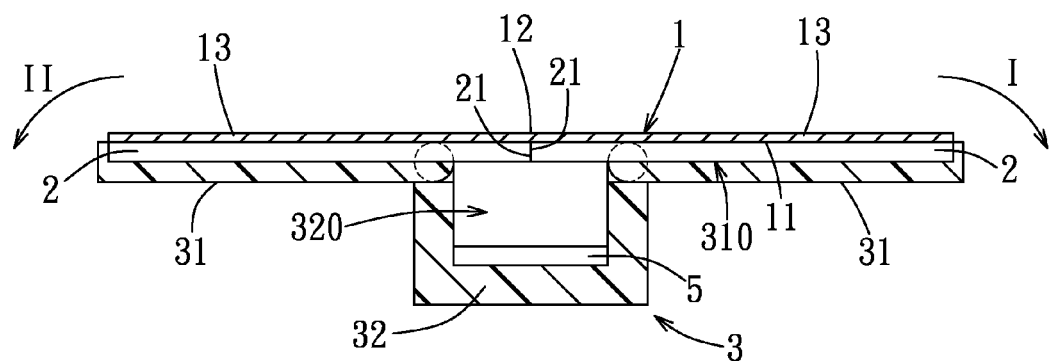
FIG. 6 is a sectional view of the first embodiment, illustrating how the casing panels are rotated to a non-collapsed position.
Figure 7:
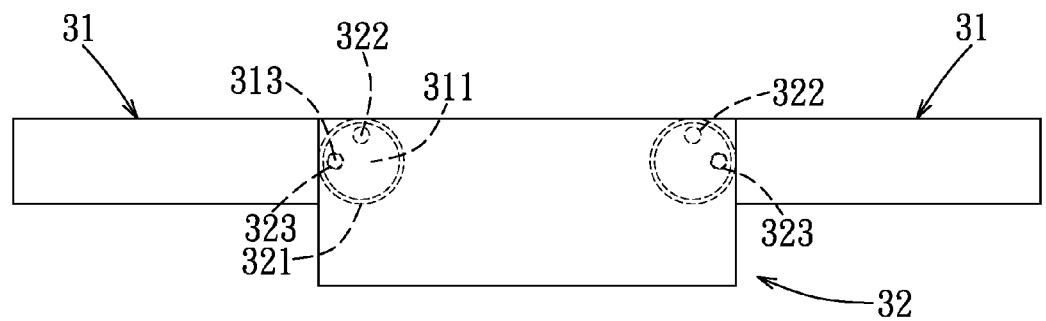
FIG. 7 is a schematic view of the first embodiment, illustrating the retaining element engaging a second positioning hole in the connecting member of the outer casing when the casing panels are in the non-collapsed position.
Figure 8:
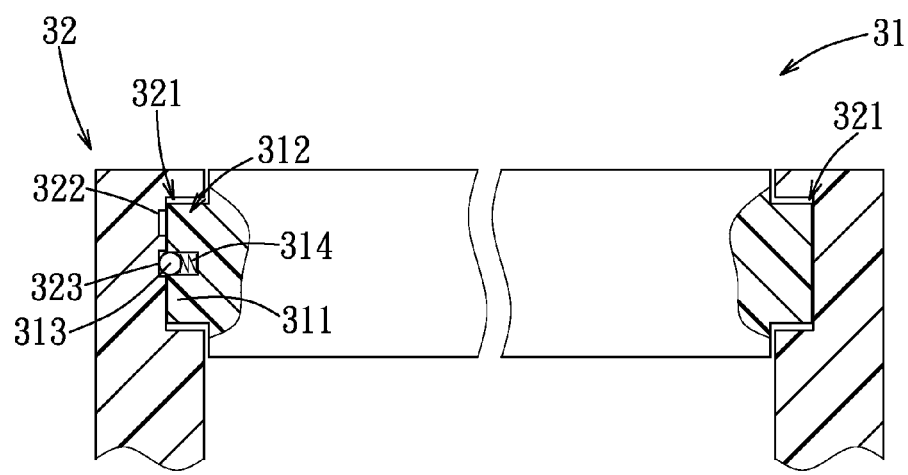
FIG. 8 is a fragmentary sectional view of the first embodiment, illustrating how the retaining element engages the second positioning hole.

With reference to FIGS. 6 to 8, to rotate the casing panels 31 from the collapsed position to the non-collapsed position, the casing panels 31 are turned in the direction of arrows (I, II), respectively. During rotation of the casing panels 31, the retaining element 313 moves away from the first positioning hole 322 and retracts into the mounting groove 312 to compress the biasing spring 314. When the casing panels 31 move to the non-collapsed position, the mounting groove 312 of the pivot unit 311 of each casing panel 31 is aligned with the second positioning hole 323, and through a restoring force of the biasing spring 314, the retaining element 313 is biased to move out of the mounting groove 312 and engage the second positioning hole 323. As such, the casing panels 31, the first backlight modules 2, and the flexible display panel 1 are retained in the non-collapsed position. In the non-collapsed position, the flexible display panel 1 is laid flat, the two first backlight modules 2 coplanarly cover the back face 11 of the flexible display panel 1, and the first contact ends 21 of the first backlight modules 2 abut against each other. Through this, the two first backlight modules 2 can provide uniform light to the flexible display panel 1.

Figure 9:
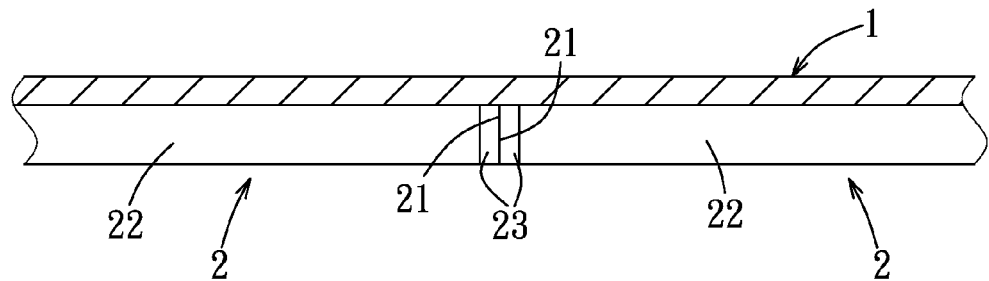
FIG. 9 is a fragmentary sectional view of a flexible display panel and two first backlight modules of the first embodiment, illustrating first resilient buffers of first contact ends of the first backlight modules abutting against each other.
Figure 10:
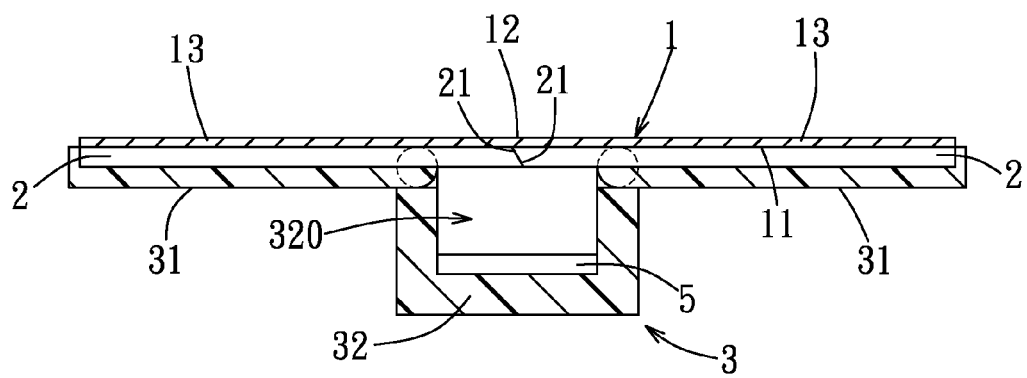
FIG. 10 is a sectional view of the first embodiment, illustrating the first contact ends of the first backlight modules respectively having inclined end faces abutting against each other.

In this embodiment, because the first contact end 21 of each first backlight module 2 has a right-angled end face, to prevent dissipation of light between the first contact ends 21 of the first backlight modules 2, the display 100 further comprises a second backlight module 5 disposed in a receiving space 320 that is defined by the connecting member 32. A light-emitting element (not shown) of the second backlight module 5 may be a cold cathode tube, a light-emitting diode, or an organic light-emitting diode. When the first backlight modules 2 are in the non-collapsed position, the second backlight module 5 corresponds in position to the first contact ends 21 of the first backlight modules 2, so that the second backlight module 5 can achieve a light-enhancing effect. Thus, the first backlight modules 2 and the second backlight modules 5 can provide uniform light to the flexible display panel 1. With reference to FIG. 9, each first backlight module 2 includes a first main plate body 22 having the first contact end 21. The first contact end 21 includes a first resilient buffer 23 having a light-guiding property. Through the presence of the first resilient buffer 23, when the first backlight modules 2 are moved from the collapsed position to the non-collapsed position, the first resilient buffers 23 abut tightly against each other so that there is no gap therebetween. Further, the two first backlight modules 2 can be prevented from being damaged due to impact between the same during movement to the non-collapsed position.

Figure 11:
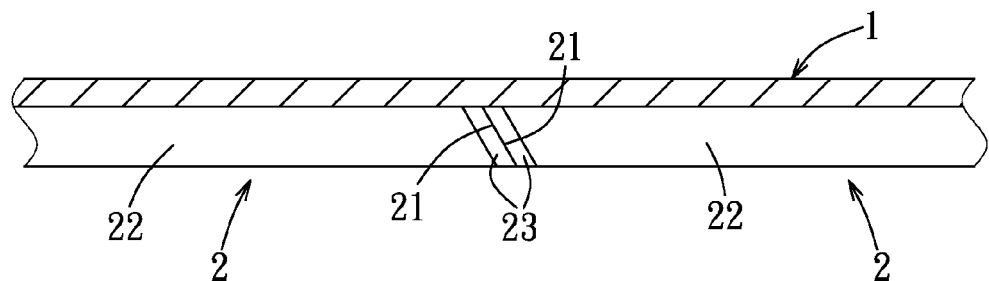
FIG. 11 is a fragmentary sectional view of the flexible display panel and the first backlight modules of FIG. 10, illustrating the first contact ends of the first backlight modules respectively including the first resilient buffers.

It should be noted that the first contact end 21 of each first backlight module 2 may have an inclined end face (see FIG. 10), so that when the first backlight modules 2 are in the non-collapsed position, the first contact ends 21 of the first backlight modules 2 can abut tightly against each other, thereby reducing dissipation of light. FIG. 11 illustrates the inclined first contact ends 21 of the first backlight modules 2 respectively including the first resilient buffers 23.

Figure 12:
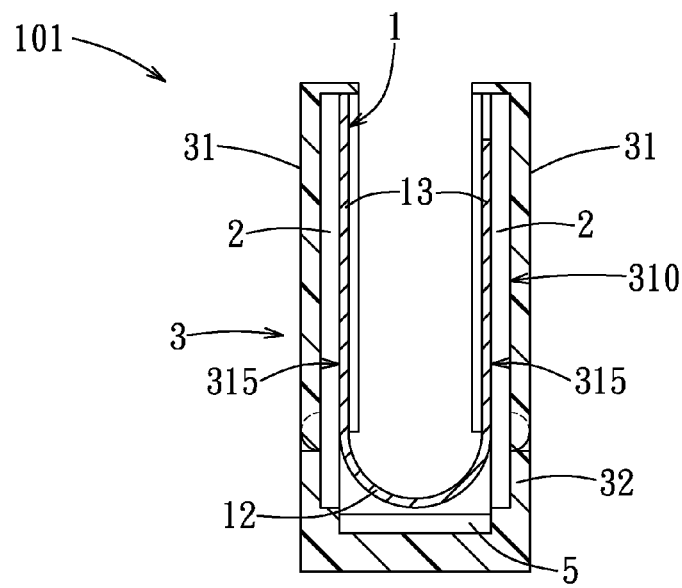
FIG. 12 is a sectional view of a display according to the second embodiment of the present invention, illustrating two casing panels of an outer casing of the display in a collapsed position.
Figure 13:
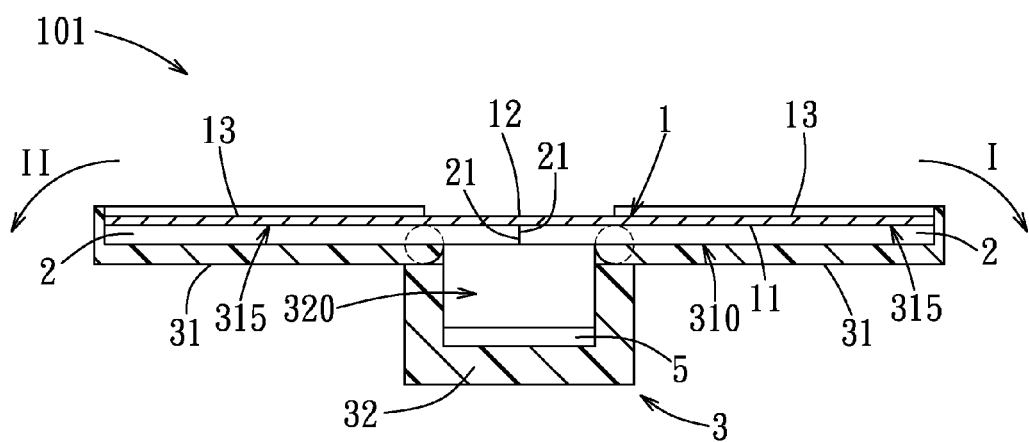
FIG. 13 is a view similar to FIG. 12, but illustrating how the casing panels are rotated to a non-collapsed position.
Figure 14:
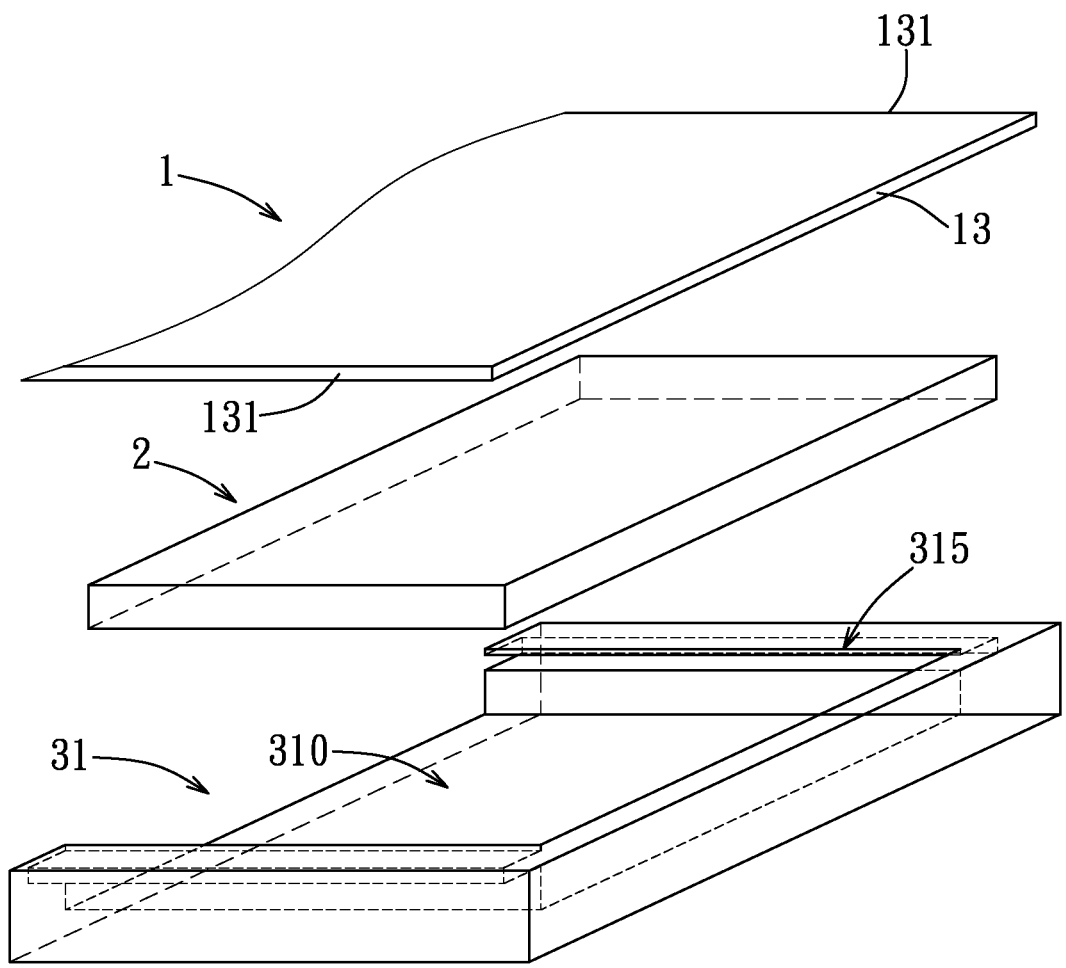
FIG. 14 is a fragmentary exploded perspective view of the second embodiment.
Figure 15:
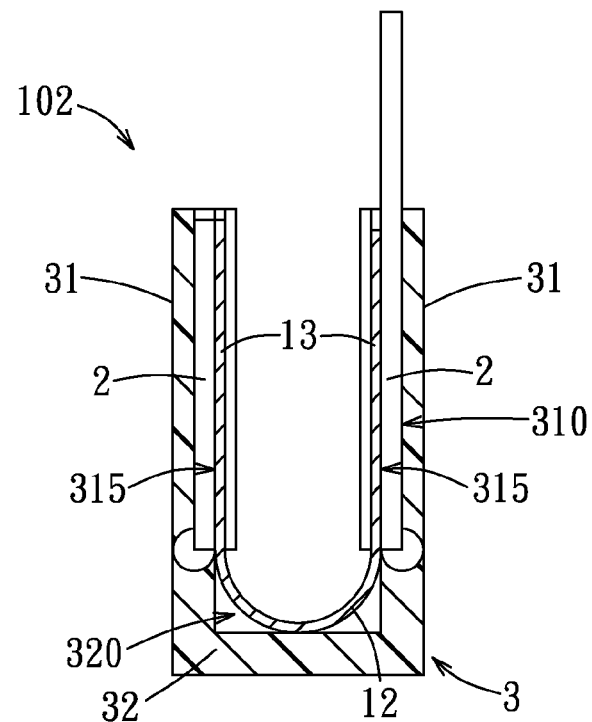
FIG. 15 is a sectional view of a display according to the third embodiment of the present invention, illustrating two casing panels of an outer casing of the display in a collapsed position.
Figure 16:
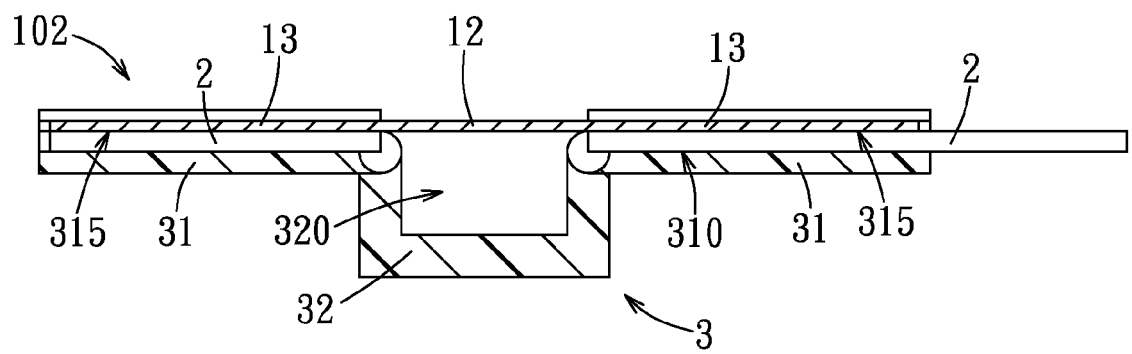
FIG. 16 is a view similar to FIG. 15, but illustrating the casing panels in a non-collapsed position.
Figure 17:
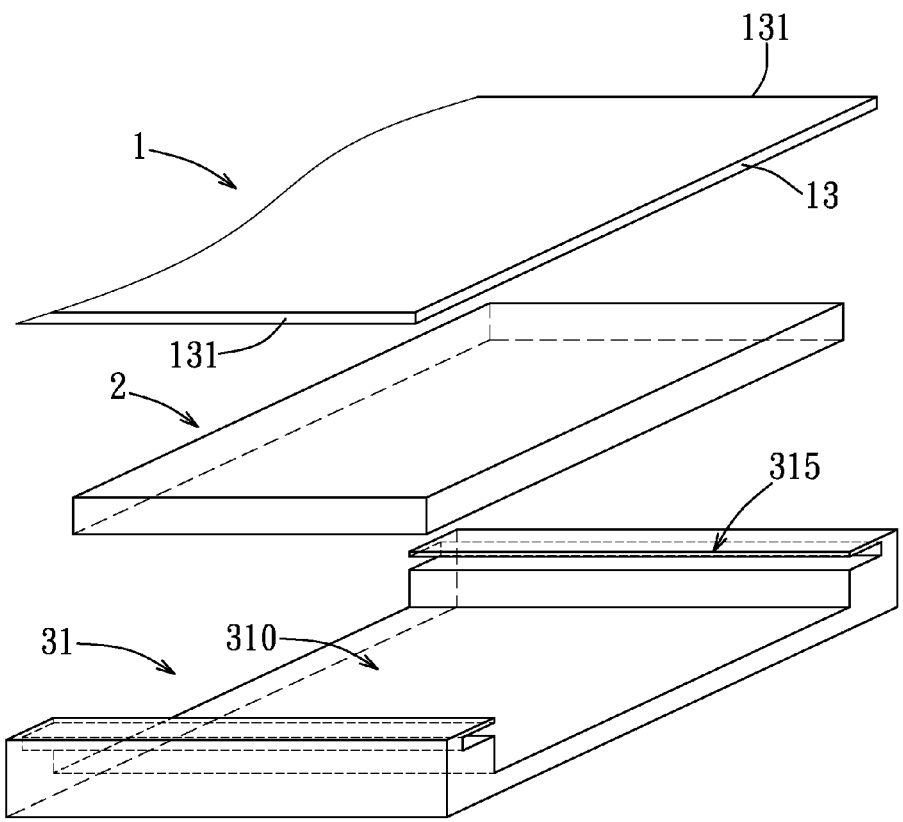
FIG. 17 is a fragmentary exploded perspective view of the third embodiment.
Figure 18:
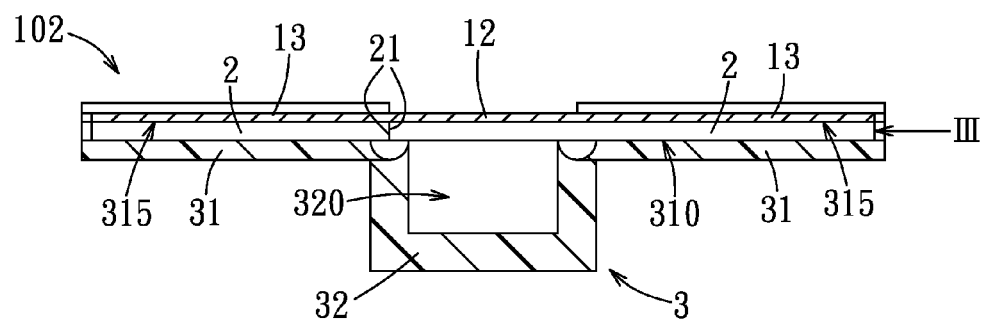
FIG. 18 is a view similar to FIG. 16, but illustrating a longer one of the first backlight modules being pushed inwardly to abut against a shorter one of the first backlight modules.
Figure 19:
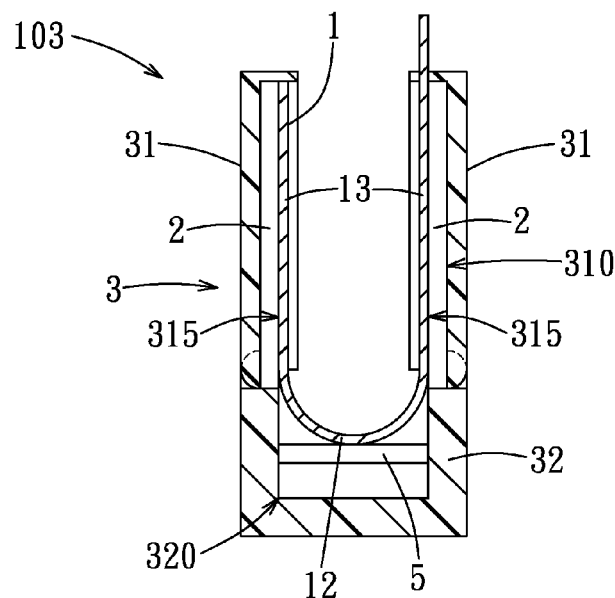
FIG. 19 is a sectional view of a display according to the fourth embodiment of the present invention, illustrating two casing panels of an outer casing of the display in a collapsed position.
Figure 20:
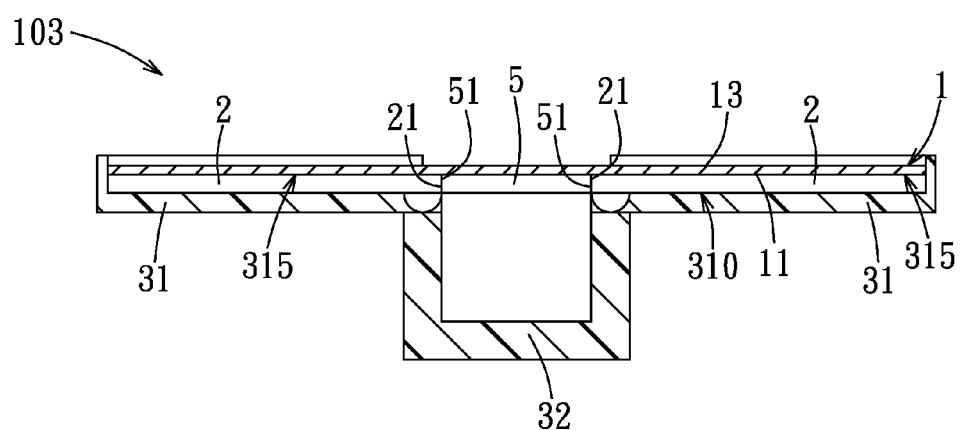
FIG. 20 is a view similar to FIG. 19, but illustrating the casing panels in a non-collapsed position.
Figure 21:
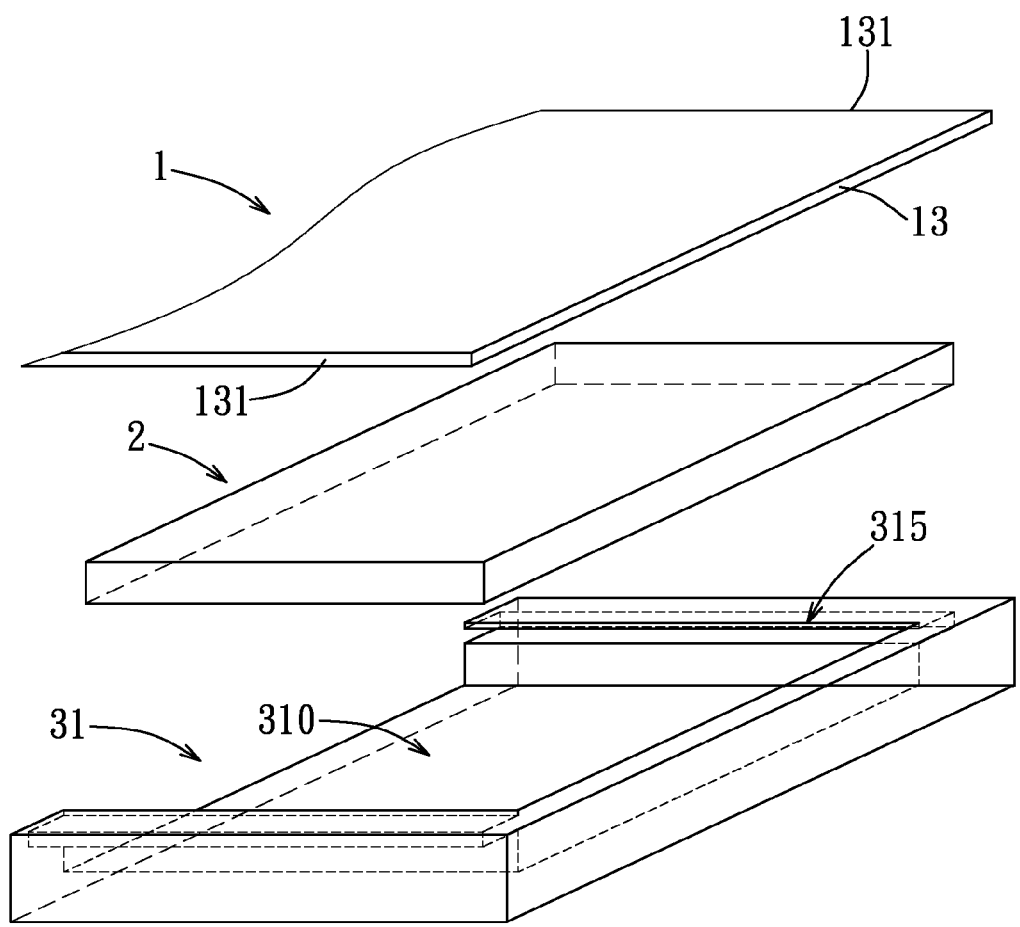
FIG. 21 is a fragmentary exploded perspective view of the fourth embodiment.

Referring to FIGS. 12 to 14, a display 101 according to the second embodiment of the present invention is shown to be similar to the first embodiment. The difference between the first and second embodiments resides in the connection of the flexible display panel 1.

Through the below structure, when the casing panels 31 rotate to the non-collapsed position, the first backlight modules 2 can similarly cover the back face 11 of the flexible display panel 1. In this embodiment, one of the side panel sections 13 of the flexible display panel 1 is shorter than the other side panel section 13 when the casing panels 31 of the outer casing 3 are in the collapsed position. Further, one of the casing panels 31 is further formed with a pair of slide grooves 315 (only one is visible in FIG. 14) on two opposite sides of the recess 310 and extending in a left-right direction. The long side panel section 13 is fixed to one of the first backlight modules 2. The short side panel section 13 is slidable relative to the other one of the first backlight modules 2, and has two opposite ends 131 connected slidably and respectively to the slide grooves 315. The short side panel section 13 is slidable in the slide grooves 315 through a guide rail or guide roller. When the casing panels 31 are rotated from the collapsed position to the non-collapsed position, the two first backlight modules 2 can coplanarly cover the back face 11 of the flexible display panel 1.

Referring to FIGS. 15 to 18, a display 102 according to the third embodiment of the present invention is shown to be similar to the second embodiment. The difference between the second and third embodiments resides in the connection of the first backlight modules 2.

In this embodiment, one of the first backlight modules 2 is shorter than the other first backlight module 2. The short first backlight module 2 is fixed to one of the side panel sections 13. The long first backlight module 2 is connected slidably to the recess 310. The long first backlight module 2 is slidable in the recess 310 through a guide rail or guide roller. When the casing panels 31 are in the collapsed position, the foldable intermediate section 12 of the flexible display panel 1 extends into the receiving space 320, and the long first backlight module 2 extends through the recess 310 and out of the corresponding casing panel 31. When the casing panels 31 are rotated from the collapsed position to the non-collapsed position, the short side panel section 13 of the flexible display panel 1 slides relative to the corresponding casing panel 31, and the long first backlight module 2 extends out of the corresponding casing panel 31. The user can push the long first backlight module 2 inwardly along the direction of an arrow (III) (see FIG. 18) so as to abut against the short first backlight module 2. As such, the short and long first backlight modules 2 can cooperatively cover the back face 11 of the flexible display panel 1.

Referring to FIGS. 19 to 24, a display 103 according to the fourth embodiment of the present invention is shown to be similar to the first embodiment. However, in this embodiment, the second backlight module 5 is disposed on the back face 11 of the flexible display panel 1, and has a structure similar to that of the first backlight module 2. The second backlight module 5 is fixed to the connecting member 32, and includes two opposite second contact ends 51 respectively abuttable against the first contact ends 21 of the first backlight modules 2.

Further, one of the casing panels 31 is further formed with a pair of slide grooves 315 (only one is visible in FIG. 21) on two opposite sides of the recess 310 and extending in a left-right direction. One of the side panel sections 13 of the flexible display panel 1 is shorter than the other side panel section 13. The short side panel section 13 is fixed to one of the first backlight modules 2. The long side panel section 13 has two opposite ends 131 connected slidably and respectively to the slide grooves 315. When the casing panels 31 are in the collapsed position, the long side panel section 13 extends through the slide grooves 315 and out of the corresponding casing panel 31, the flexible display panel 1 is folded, and the first backlight modules 2 are disposed respectively on left and right sides of the second backlight module 5. When the casing panels 31 are rotated from the collapsed position to the non-collapsed position, the long side panel section 13 slides into the slide grooves 315, and the first backlight modules 2 and the second backlight module 5 coplanarly cover the back face 11 of the flexible display panel 1. Moreover, the first contact ends 21 of the first backlight modules 2 abut respectively against the second contact ends 51 of the second backlight module 5.

Figure 22:
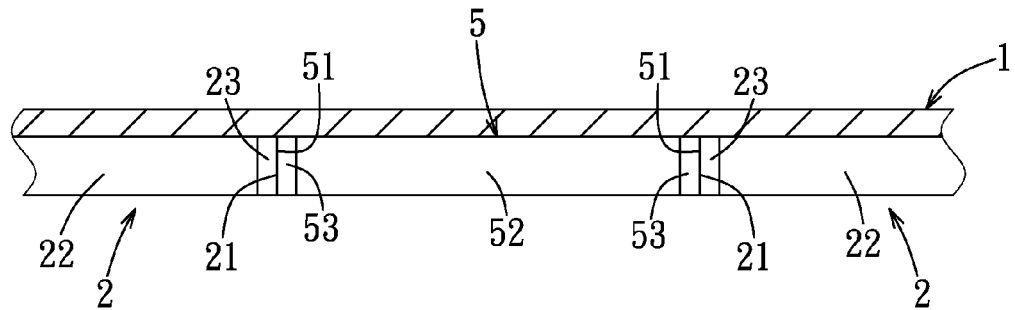
FIG. 22 is a fragmentary sectional view of a flexible display panel, two first backlight modules, and a second backlight module of the fourth embodiment, illustrating first resilient buffers of first contact ends of the first backlight modules abutting respectively against second resilient buffers of second contact ends of the second backlight module.
Figure 23:
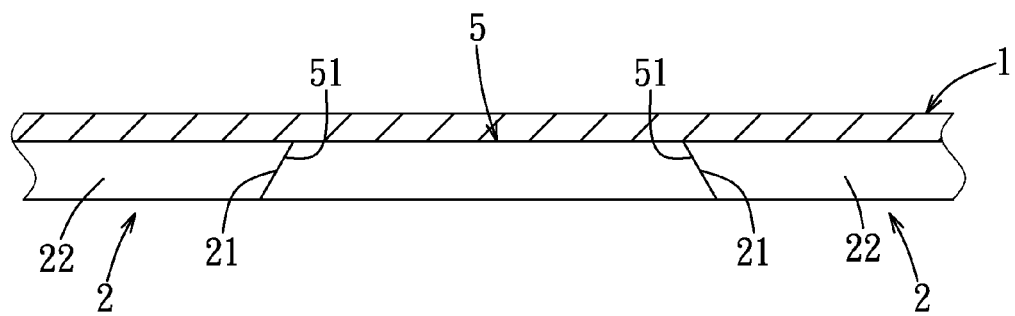
FIG. 23 is a view similar to FIG. 22, but illustrating each of the first and second contact ends having an inclined end face.

With reference to FIG. 22, the second backlight module 5 includes a second main plate body 52 having the second contact ends 51. Each second contact end 51 includes a second resilient buffer 53. Each of the first and second resilient buffers 23, 53 has a light-guiding property. Each of the first and second contact ends 21, 51 has a right-angled end face. Through this, the first resilient buffer 23 and the second resilient buffers 53 can abut tightly against each other, so that there is no gap therebetween. Further, the first and second backlight modules 2, 5 can be prevented from being damaged due to impact between the same during movement to the non-collapsed position.

Figure 24:
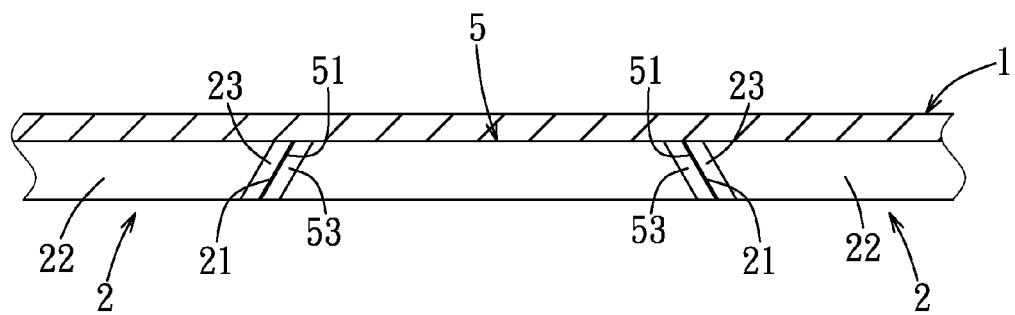
FIG. 24 is a view similar to FIG. 23, but illustrating the first and second contact ends with the respective first and second resilient buffers.
Figure 25:
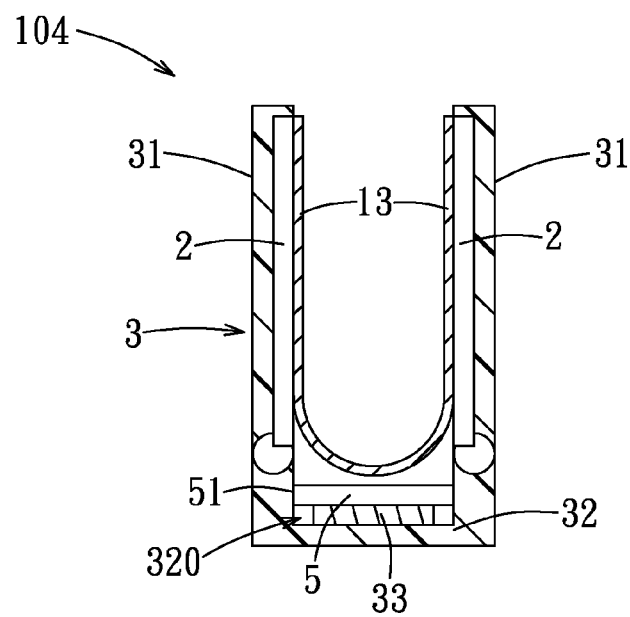
FIG. 25 is a sectional view of a display according to the fifth embodiment of the present invention, illustrating casing panels of an outer casing of the display in a collapsed position.
Figure 26:
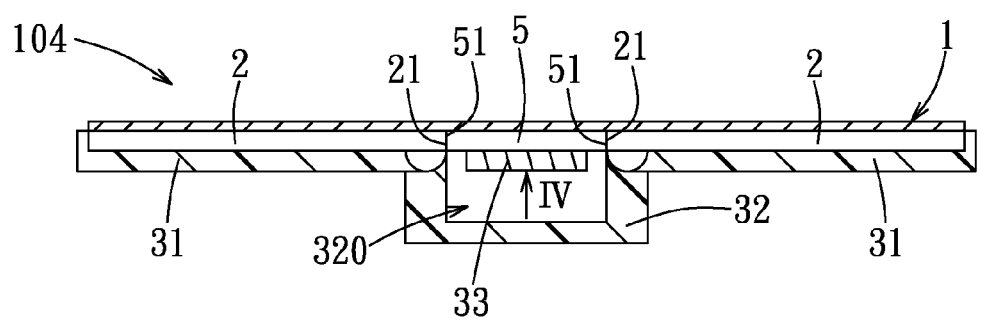
FIG. 26 is a view similar to FIG. 25, but illustrating how a second backlight module is pushed upward by a moving mechanism when the casing panels are rotated to a non-collapsed position.
Figure 27:
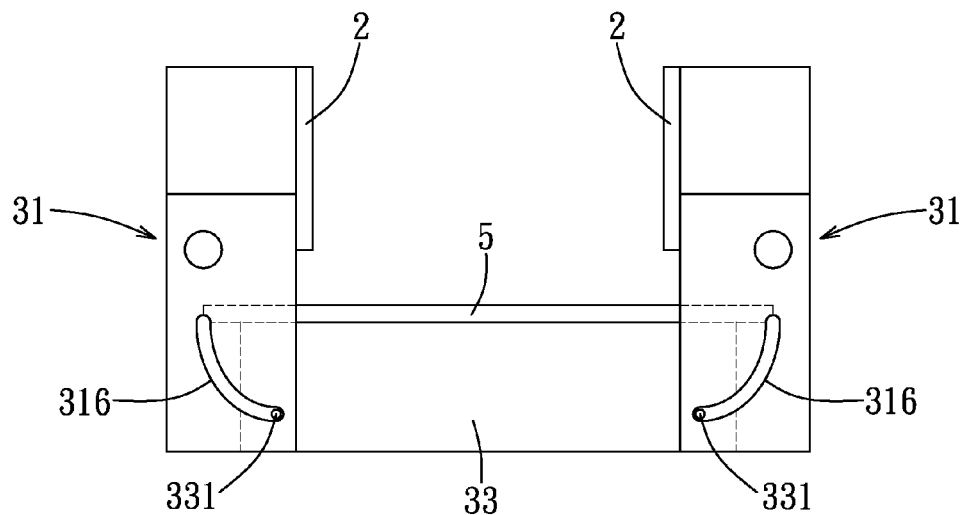
FIG. 27 is a schematic view of the fifth embodiment, illustrating projecting pins of the moving mechanism received respectively in curved cam slots of the casing panels.
Figure 28:
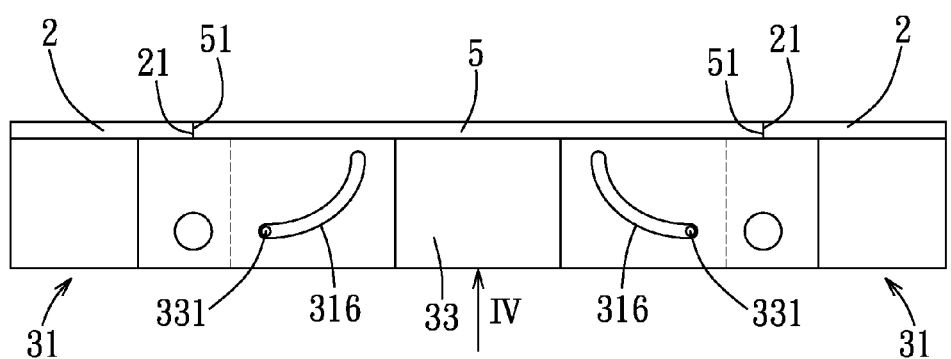
FIG. 28 is a view similar to FIG. 27, but illustrating how the second backlight module is pushed upward by the moving mechanism to lie coplanarly with two first backlight modules when the casing panels are rotated to the non-collapsed position.
Figure 29:
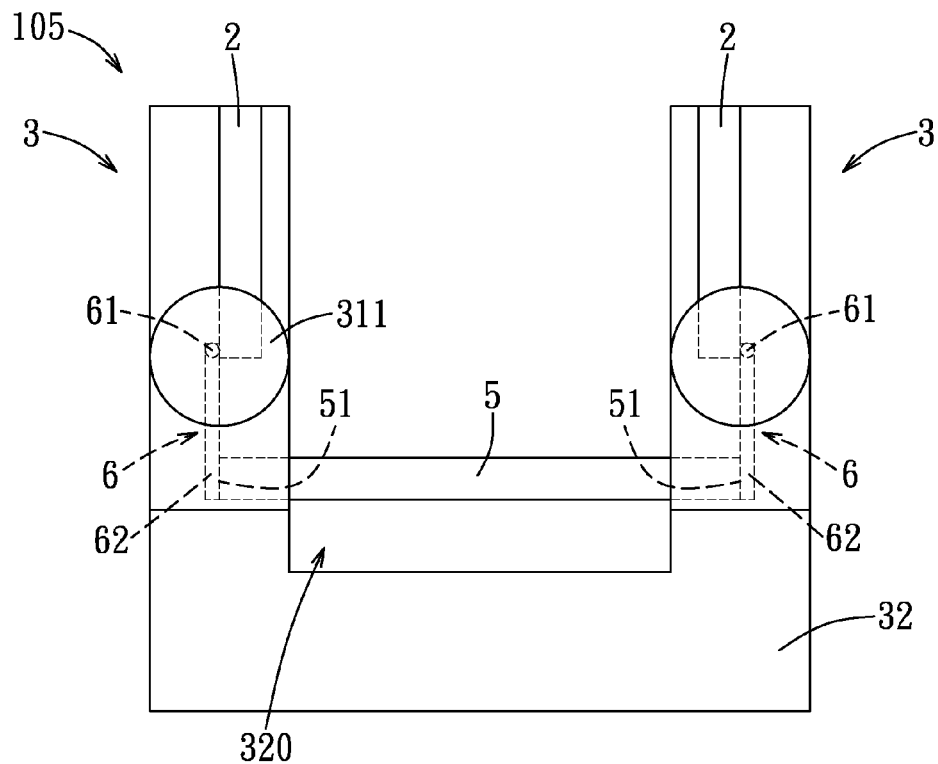
FIG. 29 is a schematic view of a display according to the sixth embodiment of the present invention, illustrating two casing panels of an outer casing of the display in a collapsed position.
Figure 30:
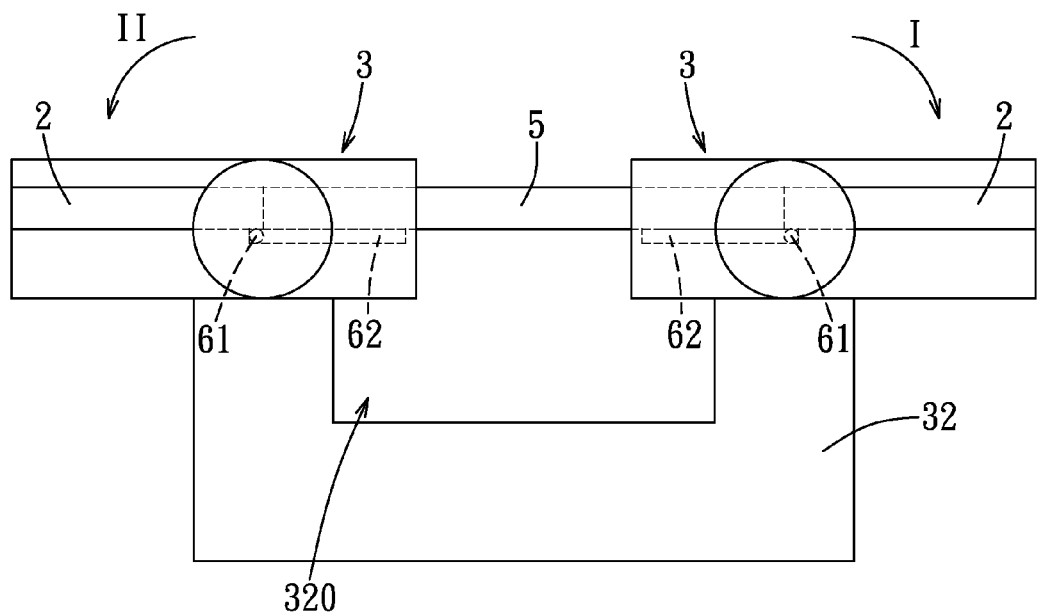
FIG. 30 is a view similar to FIG. 29, but illustrating how a pair of push bodies of a moving mechanism can push upward a second backlight module to lie coplanarly with two first backlight modules when the casing panels are rotated to a non-collapsed position.

It should be noted that each of the first and second contact ends 21, 51 may have an inclined end face (see FIG. 24), so that when the first backlight modules 2 are moved to the non-collapsed position, the first contact ends 21 of the first backlight modules 2 can abut tightly and respectively against the second contact ends 51 of the second backlight module 5, thereby reducing dissipation of light. FIG. 24 illustrates the inclined first contact ends 21 of the first backlight modules 2 respectively including the first resilient buffers 23, and the inclined second contact ends 51 of the second backlight module 5 respectively including the second resilient buffers 53.

Referring to FIGS. 25 to 28, a display 104 according to the fifth embodiment of the present invention is shown to be similar to the fourth embodiment. However, in this embodiment, the side panel sections 13 of the flexible display panel 1 are fixed respectively to the first backlight modules 2, and the second backlight module 5 is disposed movably in the receiving space 320 of the connecting member 32. Further, in order to move the second backlight module 5 to lie coplanarly with the first backlight modules 2 when the casing panels 31 are rotated to the non-collapsed position, the display 104 further comprises a moving mechanism. The moving mechanism, in this embodiment, includes a push body 33 disposed in the receiving space 320 below the second backlight module 5. The push body 33 has two projecting pins 331 spaced apart in a left-right direction. Each casing panel 31 is formed with a curved cam slot 316. Each projecting pin 331 is slidable along the curved cam slot 316 of a respective casing panel 31. Because the projecting pins 331 are slidable along the curved cam slots 316 in the respective casing panels 31, the push body 33 can push the second backlight module 5 to gradually move upward along the direction of an arrow (IV) to lie coplanarly with and be disposed between the first backlight modules 2 when the casing panels 31 is rotated from the collapsed position to the non-collapsed position. It should be noted that the display 104 of this embodiment may employ the engaging method described in the first embodiment, which uses the engagement of the retaining element 313 (see FIG. 5) with the first positioning hole 322 (see FIG. 5) or the second positioning hole 323 (see FIG. 5), to position the casing panels 31 in the collapsed or non-collapsed position.

Referring to FIGS. 29 to 32, a display 105 according to the sixth embodiment of the present invention is shown to be similar to the fifth embodiment. However, in this embodiment, the moving mechanism includes two push bodies 6 disposed in the receiving space 320 of the connecting member 32. Each push body 6 includes a fixing portion 61, and a rotatable push portion 62 connected to the fixing portion 61 and biased to push upward the second backlight module 5. The fixing portion 61 is provided on the pivot unit 311. In the collapsed position, the rotatable push portions 62 of the push bodies 6 abut respectively against the second contact ends 51 of the second backlight module 5. When the casing panels 31 are rotated from the collapsed position to the non-collapsed position, through a spring-loaded structure (not shown) of each rotatable push portion 62, the rotatable push portions 62 can bias the second backlight module 5 to move upward to lie coplanarly with the first backlight modules 2 and be positioned thereat.

Figure 31:
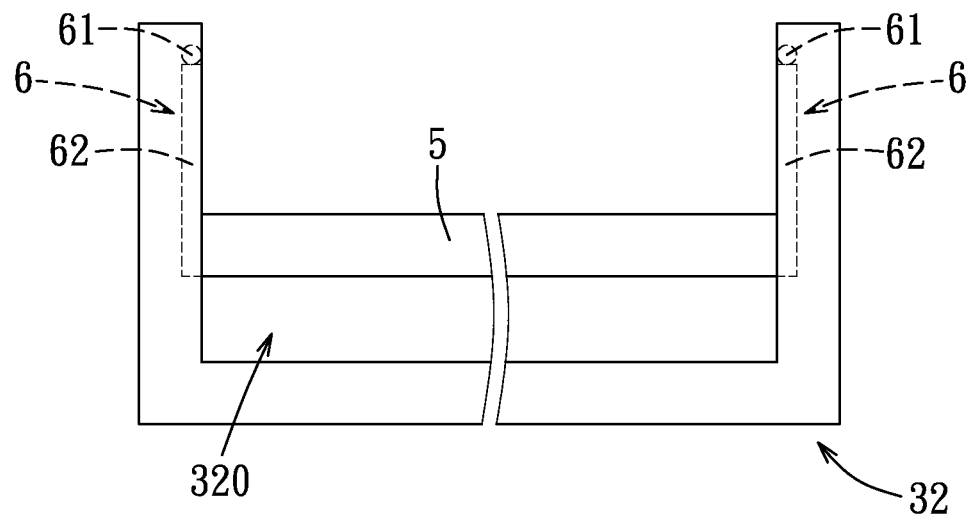
FIG. 31 is a fragmentary schematic view of the sixth embodiment, illustrating the push bodies of the moving mechanism being disposed respectively on front and rear ends of a connecting member of the outer casing.
Figure 32:
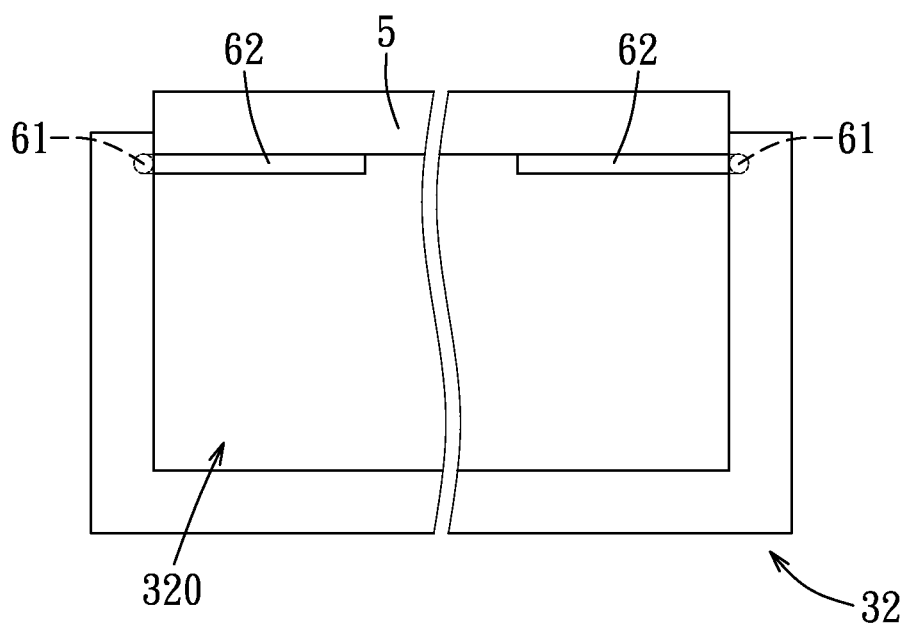
FIG. 32 is a view similar to FIG. 31, but illustrating how the second backlight module is pushed upward by the push bodies.

With reference to FIGS. 31 and 32, alternatively, the fixing portions 61 of the push bodies 6 may be respectively disposed on front and rear ends of the connecting member 32. In the collapsed position, the rotatable push portions 62 of the push bodies 6 abut respectively against front and rear ends of the second backlight module 5. When the casing panels 31 are rotated from the collapsed position to the non-collapsed position, the rotatable push portions 62 can similarly bias the second backlight module 5 to move upward to lie coplanarly with the first backlight modules 2 and be positioned thereat.

Figure 33:
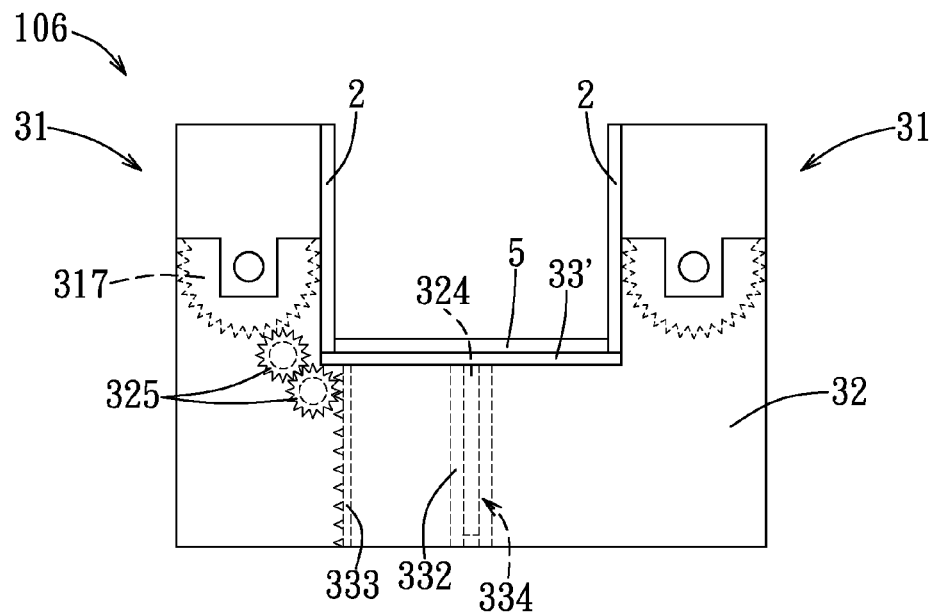
FIG. 33 is a schematic view of a display according to the seventh embodiment of the present invention, illustrating two casing panels of an outer casing of the display in a collapsed position.
Figure 34:
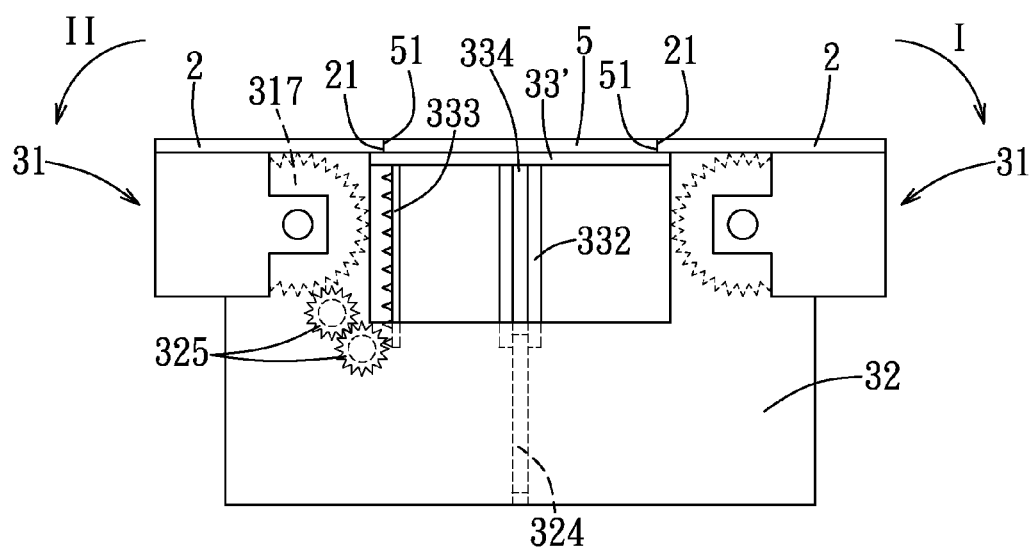
FIG. 34 is a view similar to FIG. 33, but illustrating how a push body of a moving mechanism can push upward a second backlight module to lie coplanarly with two first backlight modules when the casing panels are rotated to an non-collapsed position.
Figure 35:
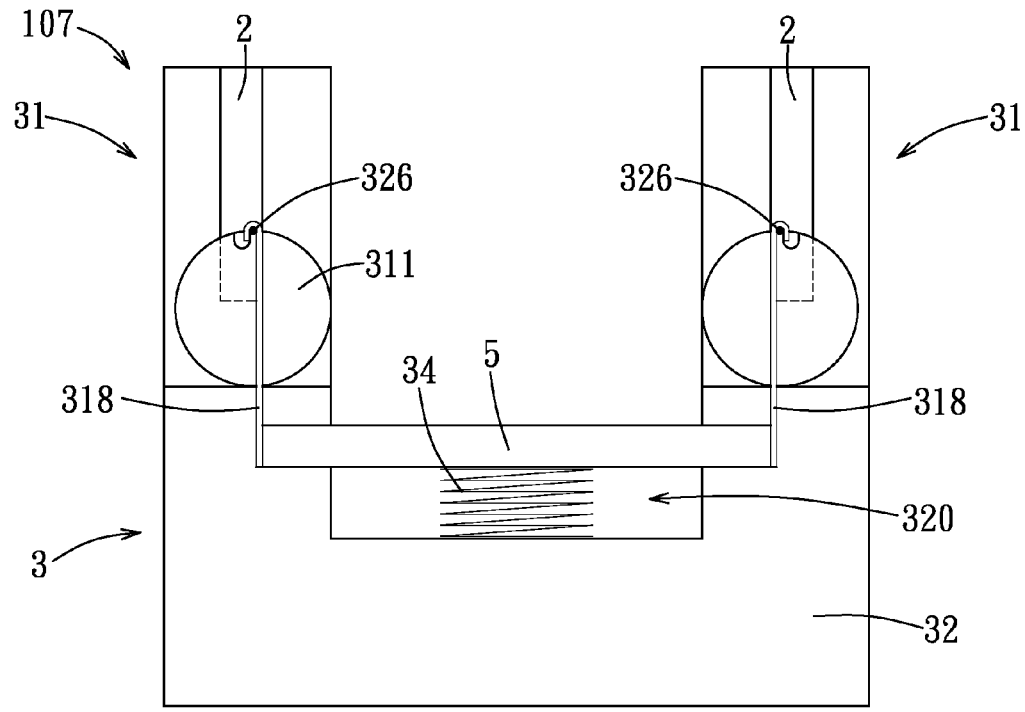
FIG. 35 is a schematic view of a display according to the eighth embodiment of the present invention, illustrating two casing panels of an outer casing of the display in a collapsed position.
Figure 36:
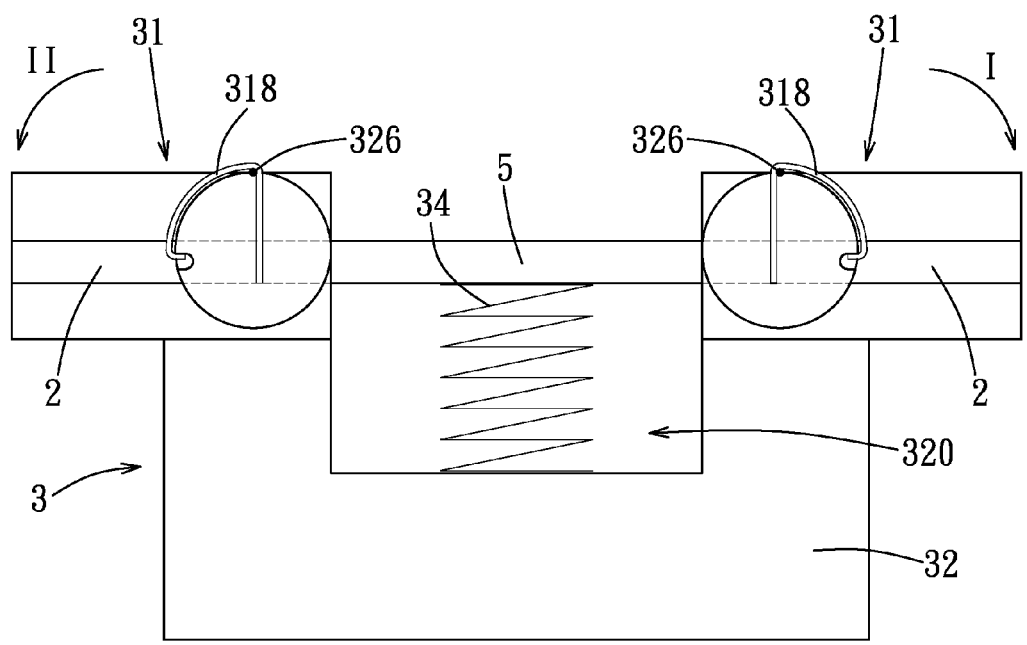
FIG. 36 is a view similar to FIG. 35, but illustrating how a second backlight module is pulled upward by two pull ropes of a moving mechanism to lie coplanarly with the first backlight modules when the casing panels are rotated to a non-collapsed position.

Referring to FIGS. 33 and 34, a display 106 according to the seventh embodiment of the present invention is shown to be similar to the fifth embodiment. However, in this embodiment, the moving mechanism includes a push body 33' to push upward the second backlight module 5, a gear rack 333 connected to and extending downwardly from the push body 33', a first guide rail body 332 extending downwardly from the push body 33' and having an elongated guide groove 334, a second guide rail body 324 provided on the connecting member 32 and extending slidably in the guide groove 334, a drive gear 317 provided on one of the casing panels 31, and a plurality of transmission gears 325 connected rotatably to the connecting member 32 and disposed between and meshing with the gear rack 333 and the drive gear 317. When the casing panels 31 are rotated from the collapsed position to the non-collapsed position, the drive gear 317 will rotate, and the transmission gears 325 are simultaneously driven by the drive gear 317 to rotate. The transmission gears 325, in turn, will drive the gear rack 333 to move gradually upward. At the same time, the push body 33' pushes upward the second backlight module 5 to lie coplanarly with the first backlight modules 2. The direction of motion of the push body 33' is restricted through cooperation of the guide groove 334 and the second guide rail body 324.

It should be noted that the display 106 of this embodiment may employ the engaging method described in the first embodiment, which uses the engagement of the retaining element 313 (see FIG. 5) with the first positioning hole 322 (see FIG. 5) or the second positioning hole 323 (see FIG. 5), to position the casing panels 31 in the collapsed or non-collapsed position; or may employ the rotatable push portions 62 of the push bodies 6 described in the sixth embodiment to bias the second backlight module 5 to move upward so as to position the second backlight module 5 in the non-collapsed position.

Referring to FIGS. 35 to 38, a display 107 according to the eighth embodiment of the present invention is shown to be similar to the fifth embodiment. However, in this embodiment, the moving mechanism includes two pull ropes 318 each having two opposite ends connected respectively to the pivot unit 311 of the respective casing panel 31 and the second backlight module 5, two guide studs 326 provided on the connecting member 32 and spaced apart in a left-right direction, and a tension spring 34 disposed in the receiving space 320 and having two opposite ends connected respectively to the second backlight module 5 and the connecting member 32. The tension spring 34 biases the second backlight module 5 to move downward.

During rotation of the casing panels 31 from the collapsed position to the non-collapsed position, the pull ropes 318 are pulled through rotation of the pivot units 311 of the casing panels 31. When pulling forces of the pull ropes 318 are larger than a downward biasing force of the tension spring 34, the pull ropes 318 can pull the second backlight module 5 to move gradually upward. When the casing panels 31 are rotated to the non-collapsed position, the pull ropes 318 pass over the respective guide studs 326 and simultaneously pull upward the second backlight module 5 to a position that is coplanar with the first backlight modules 2. On the other hand, when the casing panels 31 are rotated from the non-collapsed position to the collapsed position, the second backlight module 5 is pushed downward through a tensile force of the tension spring 34 so as to restore the second backlight module 5 to a position shown in FIG. 35.

Figure 37:
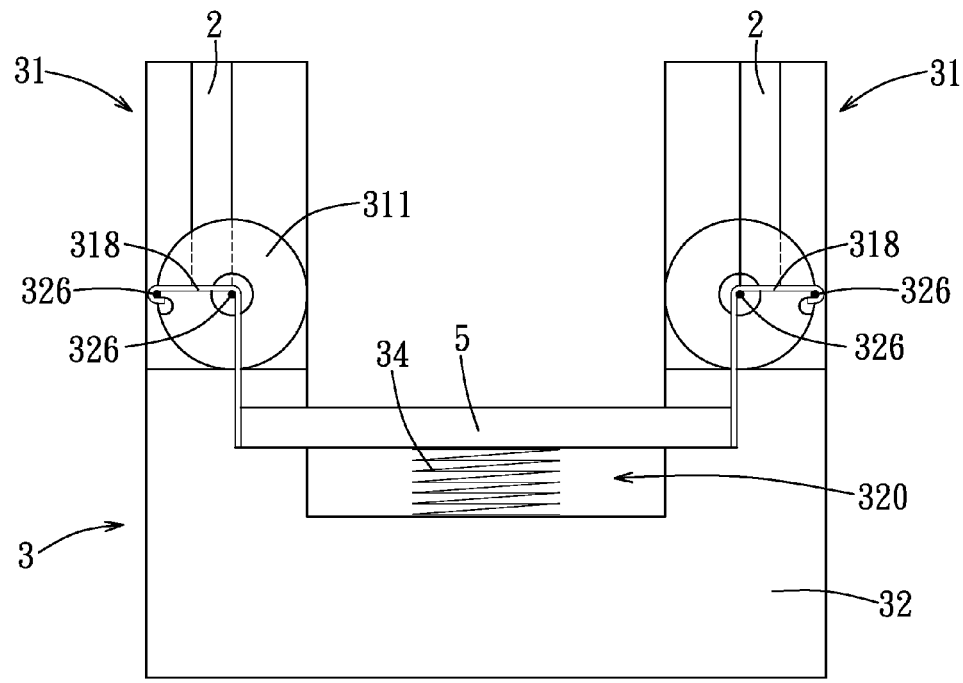
FIG. 37 is a schematic view of the eighth embodiment, illustrating the moving mechanism having four guide studs.
Figure 38:
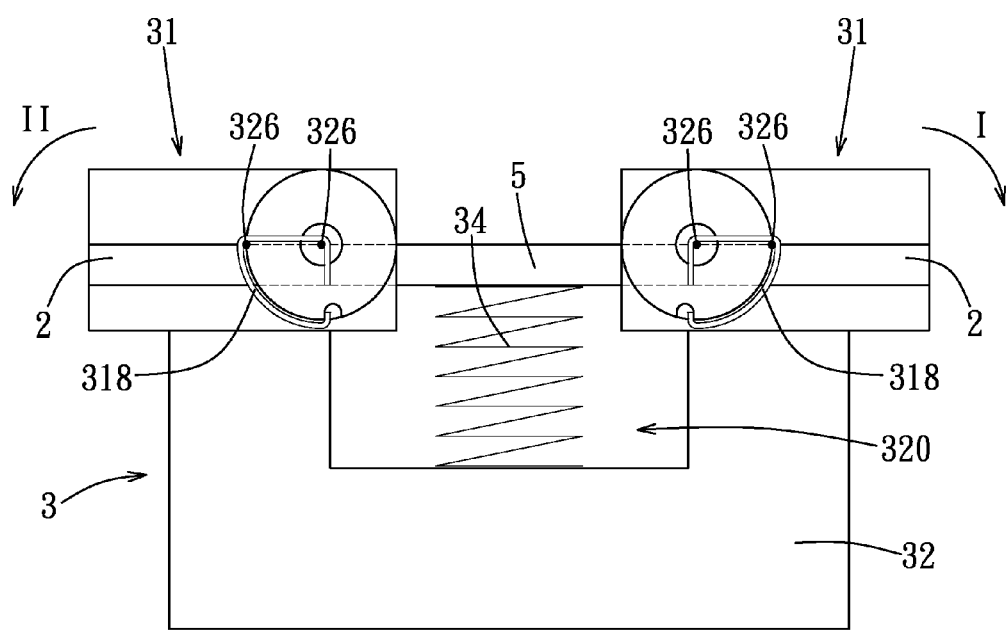
FIG. 38 is a view similar to FIG. 37, but illustrating how the second backlight module is pulled upward by the pull ropes to lie coplanarly with the first backlight modules when the casing panels are rotated to an non-collapsed position.

With reference to FIGS. 37 and 38, in an alternative form of this embodiment, the connecting member 32 includes two pairs of the guide studs 326 spaced apart in a left-right direction. The guide studs 326 of each pair are also spaced apart from each other in a left-right direction. Each pull rope 318 extends over a corresponding pair of the guide studs 326 in the non-collapsed position. Since the actuation mode is similar to that described above, a detailed description of the same is dispensed herewith.

It should be noted that the display 107 of this embodiment may employ the engaging method described in the first embodiment, which uses the engagement of the retaining element 313 (see FIG. 5) with the first positioning hole 322 (see FIG. 5) or the second positioning hole 323 (see FIG. 5), to position the casing panels 31 in the collapsed or non-collapsed position; or may employ the rotatable push portions 62 of the push bodies 6 described in the sixth embodiment to bias the second backlight module 5 to move upward so as to position the second backlight module 5 in the non-collapsed position.

Figure 39:
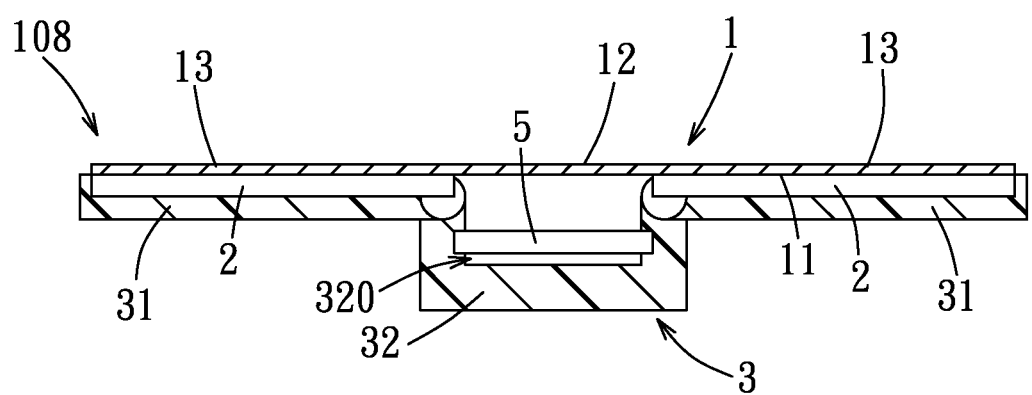
FIG. 39 is a sectional view of a display according to the ninth embodiment of the present invention, illustrating a second backlight module being disposed lower than two first backlight modules.

Referring to FIG. 39, a display 108 according to the ninth embodiment of the present invention is shown to be similar to the fifth embodiment. However, in this embodiment, the second backlight module 5 is fixed in the receiving space 320 of the connecting member 32. When the two casing panels 31 are rotated to the non-collapsed position, the second backlight module 5 is non-coplanar with the first backlight modules 2, and is disposed lower than the first backlight modules 2. Because the irradiation of light of the second backlight module 5 is stronger than that of the first backlight modules 2, the second backlight module 5 can achieve a light-enhancing effect, so that the first and second backlight modules 2, 5 can similarly provide uniform light to the flexible display panel 1.

It should be noted that the two side panel sections 13 of the flexible display panel 1 of this embodiment may be connected fixedly and respectively to the two first backlight modules 2, or, as disclosed in the second embodiment and shown in FIG. 14, one of the side panel sections 13 may be fixed to one of the first backlight modules 2, while the other side panel section 13 may be slidable in the slide grooves 315 of the connecting member 32. Other alternative is, as disclosed in the third embodiment and shown in FIG. 17, one of the first backlight modules 2 is slidable in the recess 310 of the connecting member 32. Further, the display 108 of this embodiment may employ the engaging method described in the first embodiment, which uses the engagement of the retaining element 313 (see FIG. 5) with the first positioning hole 322 (see FIG. 5) or the second positioning hole 323 (see FIG. 5), to position the casing panels 31 in the folded or non-collapsed position.

From the aforesaid description, through the structural configurations of the two first backlight modules 2 or a combination of the two backlight modules 2 and the second backlight module 5, the flexible display panel 1 can be provided with uniform light so that the flexible display panel 1 can, in turn, display uniform brightness or luminosity. Further, because the structure of the present invention is simple, the manufacturing costs thereof can be reduced to a minimum. Hence, the object of the present invention can be realized.

While the present invention has been described in connection with what are considered the most practical and embodiments, it is understood that this invention is not limited to the disclosed embodiments but is intended to cover various arrangements included within the spirit and scope of the broadest interpretations and equivalent arrangements.

What is claimed is:

1. A display for an electronic device, comprising:
a flexible display panel having a back face;
two first backlight modules disposed on said back face of said flexible display panel, each of said first backlight modules including a first contact end; and
an outer casing including two casing panels respectively connected to and supporting said first backlight modules oppositely of said flexible display panel, said casing panels being pivotal to move said first backlight modules and said flexible display panel between a collapsed position and a non-collapsed position;
wherein, in said collapsed position, said flexible display panel is folded, and said first backlight modules are parallelly spaced apart; and
wherein, in said non-collapsed position, said flexible display panel is laid flat, said first backlight modules coplanarly cover said back face of said flexible display panel, and said first contact ends of said first backlight modules abut against each other.

2. The display as claimed in claim 1, wherein said first contact end of each of said first backlight modules has a right-angled or inclined end face.

3. The display as claimed in claim 2, wherein each of said first backlight modules includes a first main plate body having said first contact end, said first contact end including a first resilient buffer that has a light-guiding property.

4. The display as claimed in claim 1, wherein said outer casing further includes a connecting member, said casing panels being connected pivotally and respectively to two opposite ends of said connecting member, said connecting member defining a receiving space between said two opposite ends of said connecting member.

5. The display as claimed in claim 4, further comprising a second backlight module disposed in said receiving space and corresponding in position to said first contact ends of said first backlight modules in said non-collapsed position.

6. The display as claimed in claim 4, wherein said flexible display panel includes a foldable intermediate section, and two side panel sections on two opposite sides of said foldable intermediate section and respectively covering said first backlight modules.

7. The display as claimed in claim 6, wherein said side panel sections are fixed respectively to said first backlight modules.

8. The display as claimed in claim 6, wherein one of said casing panels is formed with a recess, and a pair of slide grooves on two opposite sides of said recess, one of said side panel sections being fixed to one of said first backlight modules, the other one of said first backlight modules being received in said recess, the other one of said side panel sections being slidable relative to the other one of said first backlight modules and being connected slidably to said slide grooves.

9. The display as claimed in claim 8, wherein the other one of said backlight modules is slidable in said recess.

10. The display as claimed in claim 4, wherein each of said ends of said connecting member is formed with a first positioning hole, and a second positioning hole proximate to said first positioning hole, each of said casing panels including a pivot unit pivoted to said connecting member, said pivot unit being formed with a mounting groove and having a retaining element disposed in said mounting groove, and a biasing spring disposed in said mounting groove to bias outwardly said retaining element, said retaining element engaging said first positioning hole in said collapsed position, and engaging said second positioning hole in said non-collapsed position.

11. A display for an electronic device, comprising:
a flexible display panel having a back face;
two first backlight modules disposed on said back face of said flexible display panel, each of said first backlight modules including a first contact end;
a second backlight module disposed on said back face of said flexible display panel and including two opposite second contact ends; and
an outer casing including a connecting member connected to said second backlight module, and two casing panels disposed pivotally on two opposite ends of said connecting member, said casing panels being connected to and supporting said first backlight modules and said flexible display panel, said casing panels being pivotal to move said first backlight modules and said flexible display panel between a collapsed position and a non-collapsed position;
wherein, in said collapsed position, said flexible display panel is folded, and said first backlight modules are parallelly spaced apart; and
wherein, in said non-collapsed position, said flexible display panel is laid flat, said first and second backlight modules coplanarly cover said back face of said flexible display panel, and said first contact ends of said first backlight modules abut respectively against said second contact ends of said second backlight module.

12. The display as claimed in claim 11, wherein each of said first and second contact ends has a right-angled or inclined end face.

13. The display as claimed in claim 12, wherein each of said first backlight modules includes a first main plate body having said first contact end, said first contact end including a first resilient buffer, said second backlight module including a second main plate body having said second contact ends, each of said second contact ends including a second resilient buffer, each of said first and second resilient buffers having a light-guiding property.

14. The display as claimed in claim 11, wherein said flexible display panel includes a foldable intermediate section, and two side panel sections on two opposite sides of said foldable intermediate section and respectively covering said first backlight modules.

15. The display as claimed in claim 14, wherein one of said casing panels is formed with a recess, and a pair of slide grooves on two opposite sides of said recess, one of said side panel sections being fixed to one of said first backlight modules, the other one of said first backlight modules being received in said recess, the other one of said side panel sections being slidable relative to the other one of said first backlight modules and being connected slidably to said slide grooves.

16. The display as claimed in claim 14, wherein each of said ends of said connecting member is formed with a first positioning hole, and a second positioning hole proximate to said first positioning hole, each of said casing panels including a pivot unit pivoted to said connecting member, said pivot unit being formed with a mounting groove and having a retaining element disposed in said mounting groove, and a biasing spring disposed in said mounting groove to bias outwardly said retaining element, said retaining element engaging said first positioning hole in said collapsed position, and engaging said second positioning hole in said non-collapsed position.

17. The display as claimed in claim 14, wherein said side panel sections are fixed respectively to said first backlight modules, said connecting member being further formed with a receiving space receiving said second backlight module.

18. The display as claimed in claim 17, further comprising a moving mechanism to move said second backlight module to lie coplanarly with said first backlight modules.

19. The display as claimed in claim 18, wherein said moving mechanism includes a push body disposed in said receiving space below said second backlight module and having two spaced-apart projecting pins, each of said casing panels being formed with a curved cam slot, each of said projecting pins being slidable along said curved cam slot of a respective one of said casing panels.

20. The display as claimed in claim 18, wherein said moving mechanism includes a pair of push bodies disposed in said receiving space, each of said push bodies including a fixing portion, and a rotatable push portion connected to said fixing portion and biased to push said second backlight module.

21. The display as claimed in claim 18, wherein said moving mechanism includes a push body disposed in said receiving space below said second backlight module, a gear rack connected to and extending downwardly from said push body, a first guide rail body extending downwardly from said push body and having an elongated guide groove, a second guide rail body provided on said connecting member and extending slidably in said elongated guide groove, a drive gear provided on one of said casing panels, and a plurality of transmission gears connected rotatably to said connecting member and disposed between and meshing with said gear rack and said drive gear.

22. The display as claimed in claim 18, wherein each of said casing panels includes a pivot unit pivoted to said connecting member, said moving mechanism including two pull ropes each having two opposite ends connected respectively to said pivot unit and said second backlight module, two guide studs provided on said connecting member and spaced apart in a left-right direction, and a tension spring disposed in said receiving space and having two opposite ends connected respectively to said second backlight module and said connecting member, each of said pull ropes passing over a respective one of said guide studs in said non-collapsed position, said tension spring biasing said second backlight module to move downward.

23. A display for an electronic device, comprising:
a flexible display panel having a back face;
two first backlight modules disposed on said back face of said flexible display panel;
a second backlight module disposed on said back face of said flexible display panel; and
an outer casing including a connecting member connected to said second backlight module, and two casing panels disposed pivotally on two opposite ends of said connecting member, said casing panels being connected to and supporting said first backlight modules and said flexible display panel, said casing panels being pivotal to move said first backlight modules and said flexible display panel between a collapsed position and a non-collapsed position;
wherein, in said collapsed position, said flexible display panel is folded, and said first backlight modules are disposed on two opposite sides of said second backlight module; and
wherein, in said non-collapsed position, said flexible display panel is laid flat, said second backlight module is non-coplanar with said first backlight modules, and is disposed lower than said first backlight modules.

24. The display as claimed in claim 23, wherein said flexible display panel includes a foldable intermediate section, and two side panel sections on two opposite sides of said foldable intermediate section and respectively covering said first backlight modules.

25. The display as claimed in claim 24, wherein said side panel sections are fixed respectively to said first backlight modules.

26. The display as claimed in claim 24, wherein one of said casing panels is formed with a recess, and a pair of slide grooves on two opposite sides of said recess, one of said side panel sections being fixed to one of said first backlight modules, the other one of said first backlight modules being received in said recess, the other one of said side panel sections being slidable relative to the other one of said first backlight modules and being connected slidably to said slide grooves.

27. The display as claimed in claim 26, wherein the other one of said backlight modules is connected slidably to said recess.

28. The display as claimed in claim 23, wherein each of said ends of said connecting member is formed a first positioning hole, and a second positioning hole proximate to said first positioning hole, each of said casing panels including a pivot unit pivoted to said connecting member, said pivot unit being formed with a mounting groove and having a retaining element disposed in said mounting groove, and a biasing spring disposed in said mounting groove to bias outwardly said retaining element, said retaining element engaging said first positioning hole in said collapsed position, and engaging said second positioning hole in said non-collapsed position.

* * * * *